US007446812B2

(12) United States Patent
Ando et al.

(10) Patent No.: US 7,446,812 B2
(45) Date of Patent: Nov. 4, 2008

(54) WIDE DYNAMIC RANGE OPERATIONS FOR IMAGING

(75) Inventors: Haruhisa Ando, Tokyo (JP); Junichi Nakamura, Tokyo (JP)

(73) Assignee: Micron Technology, Inc., Boise, ID (US)

(*) Notice: Subject to any disclaimer, the term of this patent is extended or adjusted under 35 U.S.C. 154(b) by 810 days.

(21) Appl. No.: 10/755,411

(22) Filed: Jan. 13, 2004

(65) Prior Publication Data

US 2005/0151866 A1   Jul. 14, 2005

(51) Int. Cl.
*H04N 5/235* (2006.01)
*G03B 7/00* (2006.01)
(52) U.S. Cl. .................................. 348/362; 348/297
(58) Field of Classification Search ................. 348/297, 348/222.1–230.1, 234–239, 362–368, 272–273, 348/367
See application file for complete search history.

(56) References Cited

U.S. PATENT DOCUMENTS

| 6,008,486 | A | 12/1999 | Stam et al. |
| 6,307,195 | B1 | 10/2001 | Guidash |
| 6,480,226 | B1 * | 11/2002 | Takahashi et al. ........... 348/296 |
| 6,486,504 | B1 | 11/2002 | Guidash |
| 6,486,915 | B2 | 11/2002 | Bell et al. |
| 6,665,010 | B1 | 12/2003 | Morris et al. |
| 6,714,239 | B2 * | 3/2004 | Guidash .................. 348/223.1 |
| 6,765,611 | B1 * | 7/2004 | Gallagher et al. ......... 348/222.1 |
| 6,831,689 | B2 * | 12/2004 | Yadid-Pecht ................. 348/297 |
| 7,053,944 | B1 * | 5/2006 | Acharya et al. ............. 348/273 |
| 7,142,239 | B2 * | 11/2006 | Cho ........................... 348/273 |
| 7,145,598 | B2 * | 12/2006 | Maeda .................... 348/222.1 |
| 2003/0021488 | A1 | 1/2003 | Shaw et al. |
| 2003/0103141 | A1 | 6/2003 | Bechtel et al. |
| 2004/0041927 | A1 * | 3/2004 | Cho et al. ................... 348/254 |
| 2005/0045980 | A1 * | 3/2005 | Guidash ..................... 257/432 |

OTHER PUBLICATIONS

Wandell et al., "Multiple Capture Single Image Architecture with a CMOS Sensor" (7 pages).
Yadid-Pecht et al., "Wide Intrascene Dynamic Range CMOS APS Using Dual Sampling," *IEEE Transactions on Electron Devices*, vol. 44, No. 10, Oct. 1997, pp. 1721-1723.
Catrysse et al., "Comparative analysis of color architectures for imaging sensors" (10 pages).
Saffih et al., "Pyramidal Architecture for CMOS Image Sensor," *IEEE International Workshop on CCD and Advanced Image Sensors*, May 15-17, 2003, Schloss Elmau, Germany, pp. 1-6.

* cited by examiner

*Primary Examiner*—Lin Ye
*Assistant Examiner*—Nelson D Hernández
(74) *Attorney, Agent, or Firm*—Dickstein Shapiro LLP

(57) ABSTRACT

Embodiments provide a method and apparatus that achieve wide dynamic range operation of an image sensor. In an array of pixel cells, first charge is accumulated in a first subset of pixel cells during a first integration period and second charge is accumulated in a second subset of pixel cells during a second integration period. A length of the first integration period is different than a length of the second integration period, and the first and second charge are accumulated during a same frame and are read out.

33 Claims, 21 Drawing Sheets

WIDE DYNAMIC RANGE OPERATIONS FOR IMAGING

FIELD OF THE INVENTION

The present invention relates to the field of semiconductor devices, particularly to the operation of an image sensor to achieve improved dynamic range.

BACKGROUND OF THE INVENTION

Complimentary Metal Oxide Semiconductor (CMOS) Active Pixel Sensors (APS) are increasingly being used as a lower cost alternative to Charge Coupled Devices (CCDs). A CMOS image sensor circuit includes a focal plane array of pixel cells, each one of the cells includes a photo-conversion device, such as a photogate, photoconductor, or photodiode, for accumulating photo-generated charge. Each pixel cell may include a transistor for transferring charge from the photo-conversion device to a sensing node, and a transistor, for resetting a sensing node to a predetermined charge level prior to charge transfer. The pixel cell may also include a source follower transistor for receiving and amplifying charge from the sensing node and an access transistor for controlling the readout of the cell contents from the source follower transistor.

In a CMOS image sensor, the active elements of a pixel cell perform the necessary functions of: (1) photon to charge conversion; (2) accumulation of image charge; (3) transfer of charge to the sensing node accompanied by charge amplification; (4) resetting the sensing node to a known state before the transfer of charge to it; (5) selection of a pixel for readout; and (6) output and amplification of a signal representing pixel charge from the sensing node.

CMOS image sensors of the type discussed above are generally known as discussed, for example, in Nixon et al., "256×256 CMOS Active Pixel Sensor Camera-on-a-Chip," IEEE Journal of Solid-State Circuits, Vol. 31(12), pp. 2046-2050 (1996); and Mendis et al., "CMOS Active Pixel Image Sensors," IEEE Transactions on Electron Devices, Vol. 41(3), pp. 452-453 (1994).

A conventional CMOS pixel cell 10 is illustrated in FIG. 1. The CMOS pixel cell 10 is a four transistor (4T) cell. Pixel cell 10 comprises a photo-conversion device, typically a photodiode 21, for collecting charges generated by light incident on the pixel cell. A transfer transistor 7, when activated by a transfer control signal TX, transfers photoelectric charges from the photodiode 21 to a sense node (charge to voltage conversion node), typically a floating diffusion region 3. A reset transistor 17 resets the floating diffusion region 3 to a predetermined voltage, Vaa_pix, in response to a reset control signal RST before the floating diffusion region 3 receives photo-generated charge. Floating diffusion region 3 is also electrically connected to the gate of an output source follower transistor 27. Pixel cell 10 also includes a row select transistor 37 for outputting a signal representing the charge on the floating diffusion region 3 from the source follower transistor 27 to an output column line 40 in response to an address signal SEL.

In the pixel cell 10 depicted in FIG. 1, the photo-conversion device generates and accumulates charge, e.g., electrons, in response to incident light during an integration period. The charge is transferred to the floating diffusion region 3 by activating the gate of the transfer transistor 7. The source follower transistor 27 produces an output signal from the transferred charges, which is readout via the column line 40.

A typical CMOS image sensor includes an array of pixels 10, arranged in a predetermined number of columns and rows. Generally, each pixel generates charge for a same amount of time. Such image sensors have a characteristic dynamic range. Dynamic range refers to the range of incident light that can be accommodated by an image sensor in a single frame of pixel data. It is desirable to have an image sensor with a high dynamic range to image scenes that generate high dynamic range incident signals, such as indoor rooms with windows to the outside, outdoor scenes with mixed shadows and bright sunshine, night-time scenes combining artificial lighting and shadows, and many others.

The dynamic range for an image sensor is commonly defined as the ratio of its largest non-saturating signal to the standard deviation of the noise under dark conditions. Dynamic range is limited on an upper end by the charge saturation level of the sensor, and on a lower end by noise imposed limitations and/or quantization limits of the analog to digital converter used to produce the digital image. When the dynamic range of an image sensor is too small to accommodate the variations in light intensities of the imaged scene, image distortion occurs.

As pixel size is scaled down, so is the size of the photo-conversion device. Therefore, the amount of charge the photo-conversion device and pixel cell can accumulate is reduced, degrading the sensor's dynamic range. There are several approaches to improve dynamic range, one of which utilizes dual integration periods. Another approach would be to add transistors to the pixel. Since it is difficult to implement additional transistors inside a pixel while at the same time maintaining a small pixel size (e.g., less than approximately 3.2 μm), the dual integration period approach is more desirable because the pixel cell can remain the same and only pulse timing related modifications are needed.

Orly Yadid-Pecht et al. in the article "Wide Intrascene Dynamic Range CMOS APS Using Dual Sampling," IEEE Transactions of Electron Devices, Vol. 44, No. 10, pp. 1721-1723 (October 1997) ("Yadid-Pecht") discloses a method of operating an image sensor where, for each frame, the output data includes two sets of pixel cell outputs each having different integration periods. The image sensor according to Yadid-Pecht requires additional column signal processing circuitry above the pixel cell array. Additionally, the methods disclosed by Yadid-Pecht are not well suited to color imaging.

Wandell et al., "Multiple Capture Single Image Architecture with a CMOS Sensor," Chiba Conference on Multispectral Imaging, pp. 11-17 (1999) ("Wandell") disclosed an imaging method using multiple integration periods. With the method described by Wandell, a CMOS image sensor includes one analog to digital converter (ADC) for each 2×2 pixel cell block. The pixel cells of each block are switchably connected to a storage capacitor, which in turn is connected to the ADC. Thus, the method of Wandell requires additional circuitry and cannot be implemented using conventional CMOS image sensor circuits, which is undesirable.

U.S. Pat. No. 6,008,486 to Stam et al. ("Stam") discloses a method using dual integration periods. With Stam's method, each pixel cell integrates charge during a short integration period and a long integration period for each frame. If the pixel cell becomes saturated during the long integration period, a threshold detector causes the short integration period for that pixel cell to be used. Because each pixel cell integrates charge for two time periods per frame, additional sample and hold circuitry is required, which is undesirable.

What is needed, therefore, is a method for operating a CMOS image sensor to achieve an improved dynamic range, which can be implemented using conventional CMOS pixel cells. Additionally, it would be advantageous to have an improved method for operating a CMOS image sensor to achieve an improved dynamic range that is also well suited to color imaging.

BRIEF SUMMARY OF THE INVENTION

Embodiments of the invention provide a method and apparatus that allow for wide dynamic range operations of CMOS Active Pixel Sensors. In an array of pixel cells, first charge is accumulated in a first subset of pixel cells during a first integration period and second charge is accumulated in a second subset of pixel cells during a second integration period. A length of the first integration period is different than a length of the second integration period, and the first and second charge are accumulated during a same frame are read out.

BRIEF DESCRIPTION OF THE DRAWINGS

The foregoing and other aspects of the invention will be better understood from the following detailed description of the invention, which is provided in connection with the accompanying drawings, in which.

DETAILED DESCRIPTION OF THE INVENTION

Figure 1:
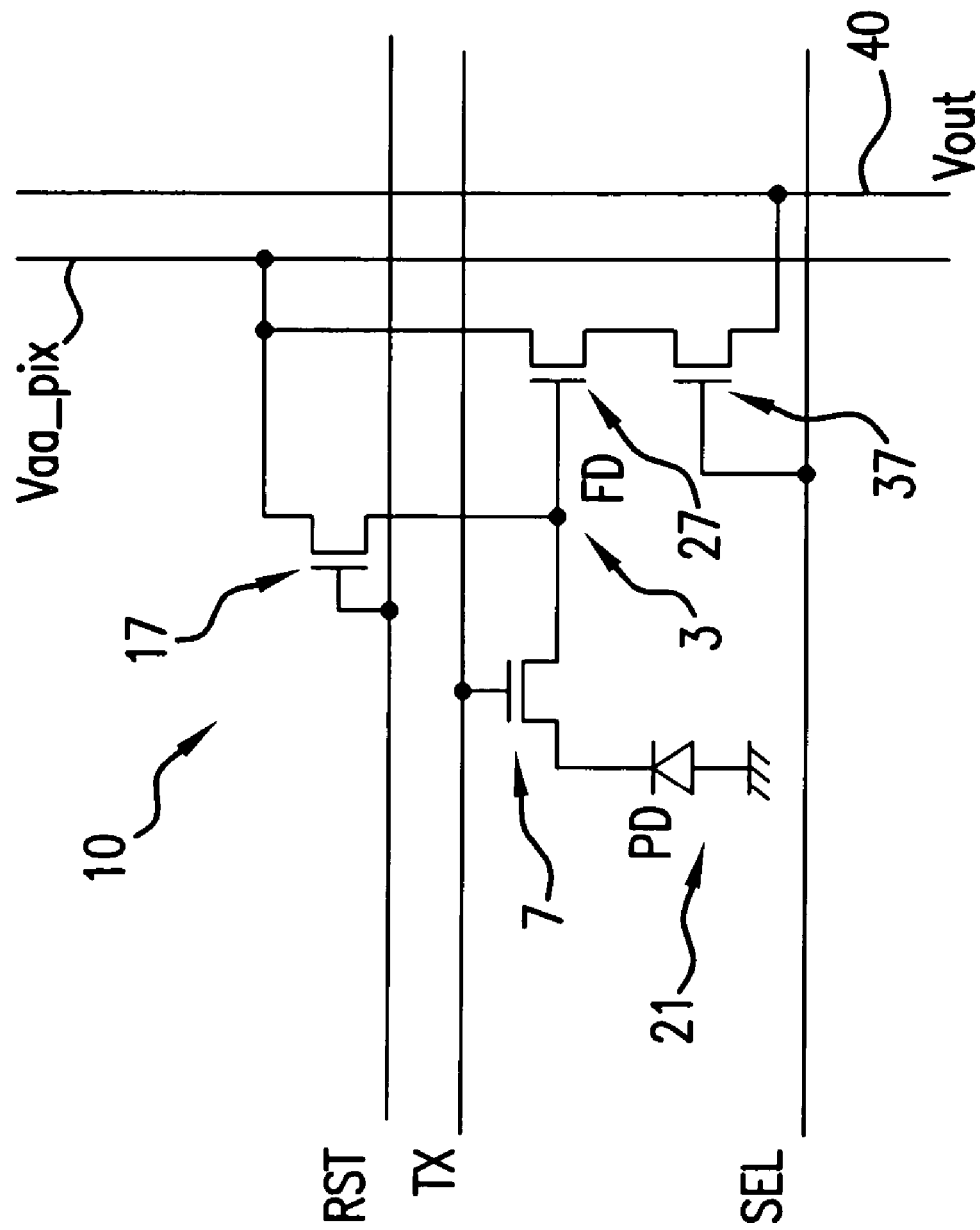
FIG. 1 is a schematic diagram of a conventional pixel cell.

In the following detailed description, reference is made to the accompanying drawings, which form a part hereof and illustrate specific embodiments in which the invention may be practiced. In the drawings, like reference numerals describe substantially similar components throughout the several views. These embodiments are described in sufficient detail to enable those skilled in the art to practice the invention, and it is to be understood that other embodiments may be utilized, and that structural, logical and electrical changes may be made without departing from the spirit and scope of the present invention.

The term "pixel" or "pixel cell" refers to a picture element unit cell containing a photo-conversion device and associated transistors or other circuitry that convert electromagnetic radiation to an electrical signal. For purposes of illustration, representative pixel cells are illustrated in the figures and description herein, and typically all pixels in an image sensor will have a similar configuration.

The invention provides embodiments in which a dual integration period approach is used to capture a wide dynamic range image. As described in more detail below, these methods are particularly useful in an on-chip color filtered CMOS APS. The invention, however, is not so limited and, as described below, is applicable to other image sensors.

Figure 2:
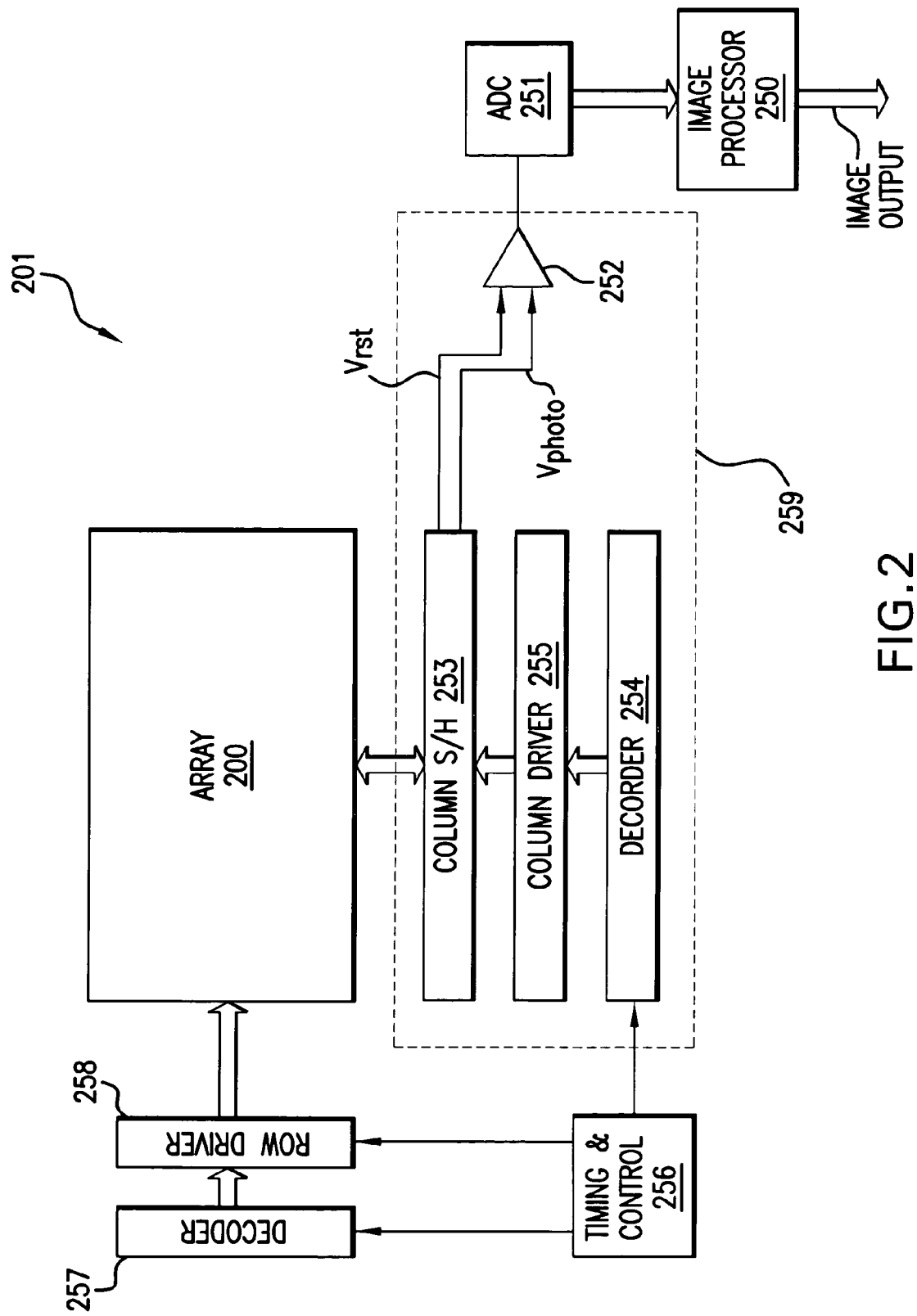
FIG. 2 is a block diagram illustrating an image sensor according to an exemplary embodiment of the invention.

FIG. 2 illustrates a block diagram of a CMOS image sensor 201, which can be operated in accordance with exemplary embodiments of the invention. Image sensor 201 includes an imaging array 200. Array 200 comprises a plurality of pixels arranged in a predetermined number of columns and rows. The pixels of each row in array 200 are all turned on at the same time by a row selected line, and the pixels of each column are selectively output by respective column select lines. A plurality of rows and column lines are provided for the entire array 200. The row lines are selectively activated in sequence by the row driver 258 in response to row address decoder 257, and the column select lines are selectively activated in sequence for each row activated by the column driver 255 in response to column address decoder 254. Thus, a row and column address is provided for each pixel cell.

Image sensor 201 is operated by the timing and control circuit 256, which controls address decoders 257, 254 for selecting the appropriate row and column lines for pixel readout, and row and column driver circuitry 258, 255 which apply driving voltage to the drive transistors of the selected row and column lines. Exemplary timing for the operation of CMOS image sensor 201 according to embodiments of the invention is described in more detail below in connection with FIGS. 3-20. According to embodiments of the invention a dual integration approach is used. Pixel cells of the array 200 each integrate light during a single integration period, and the length of an integration period for different pixel cells can be different, such that there are at least two integration periods for the array 200 as a whole.

Pixel output signals typically include a pixel reset signal $V_{rst}$ taken from the floating diffusion node when it is reset and a pixel image signal $V_{photo}$ which is taken from the floating diffusion region after photo-generated charge representing an image is transferred to the column sample and hold (S/H) circuit 253. Voltages $V_{rst}$ and $V_{photo}$ are selected by the decoder 254 via the driver 255 and are subtracted by a differential amplifier 252, which produces a differential signal, $V_{rst}$-$V_{photo}$, for each pixel cell, which represents the amount of light impinging on the pixel cells. This differential signal is digitized by an analog to digital converter (ADC) 251. The digitized pixel signals are then fed to an image processor 250 to form a digital image. Analog signal processing circuit (ASP) 259 comprises the column decoder 254, the column driver 255, the column sample and hold circuit 253, and the amplifier 252.

Figure 3:
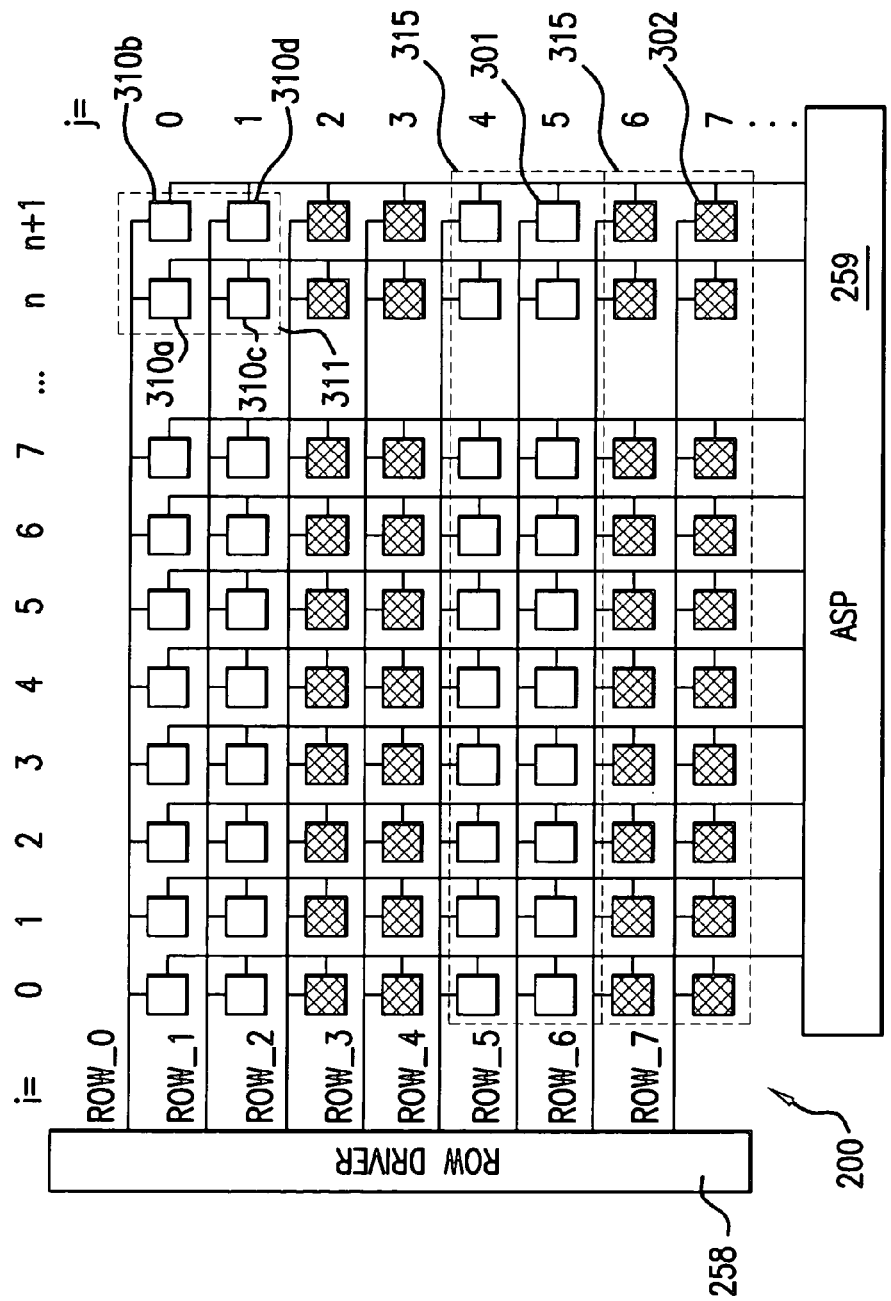
FIG. 3 is a block diagram illustrating a portion of the image sensor of FIG. 2 according to an exemplary embodiment of the invention.

FIG. 3 depicts array 200, which illustratively includes on-chip Red-Green-Blue primary color filters arranged in a Bayer pattern. Accordingly, a representative Bayer pattern unit 311 is made up of a pixel cell 310b associated with a red color filter, a pixel cell 310c associated with a blue color filter, and two pixel cells 310a, 310d each associated with a green color filter. The color filters, however, can be other colors such as, e.g., a cyan-magenta-yellow Bayer pattern. Also, the color filters can be arranged in any appropriate pattern.

Figure 4:
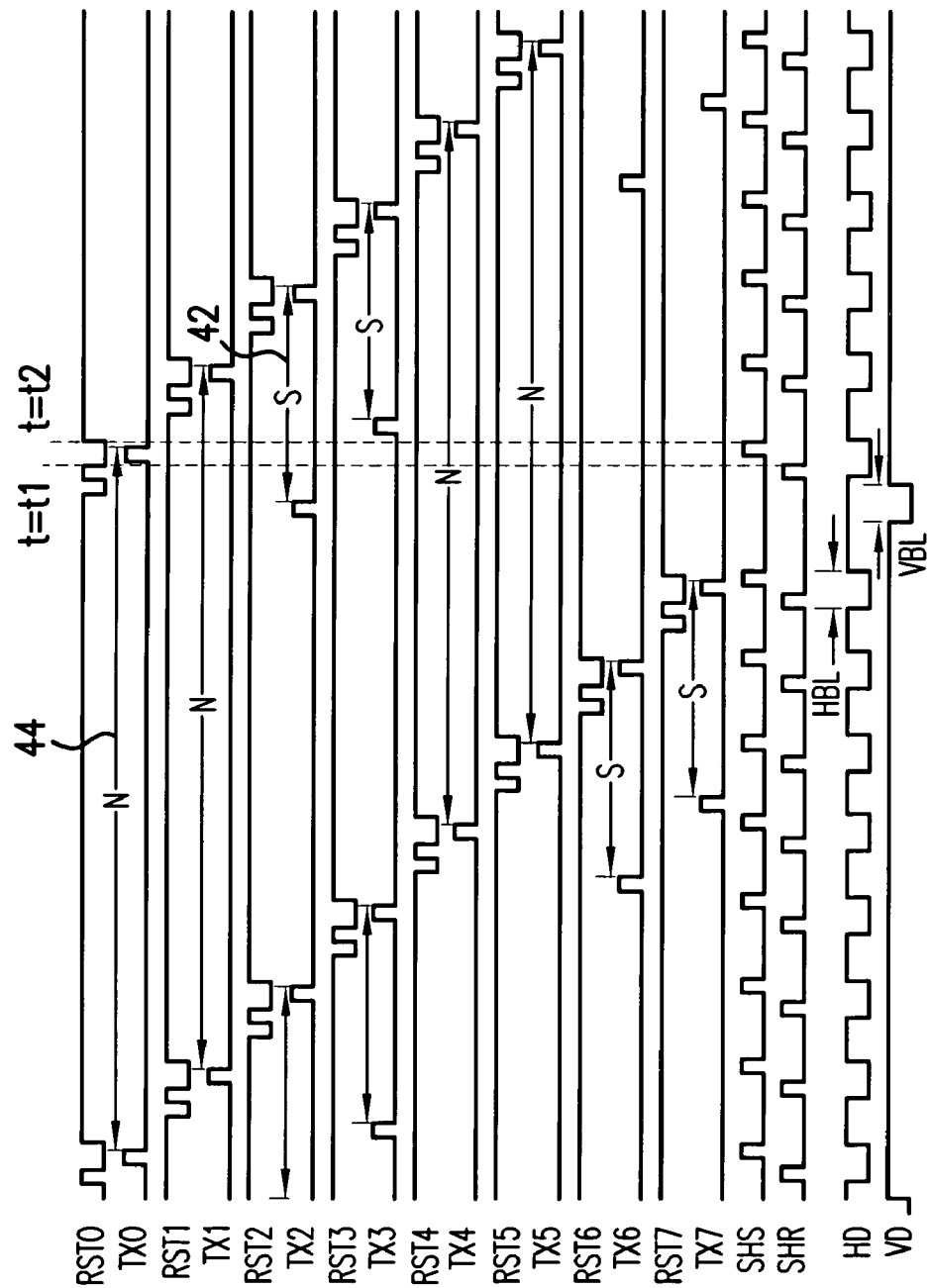
FIG. 4 is a timing diagram illustrating the operation of the image sensor of FIGS. 2 and 3 according to an exemplary embodiment of the invention.

FIG. 4 is a timing diagram illustrating the operation of image sensor 201 including the imaging array 200 of FIG. 3 in accordance with an exemplary embodiment of the invention. For this exemplary embodiment, the pixel cells of array 200 have a 4T configuration as described in connection with FIG. 1 above. In response to signals from timing and control circuitry 256, row driver 258 outputs signals to each row such that pixels in Row 0, Row 1, Row 4, Row 5, have a first integration period and pixels in Row 2, Row 3, Row 6, Row 7 have a second integration period. Accordingly, there are two subsets of pixel cells in array 200. The first subset includes pixel cells operated with an integration period 44 with a length of N, denoted by pixel cells 301 without cross hatching and the second subset includes pixel cells operated with an integration period 42 with a length of S, denoted by pixel cells 302 with cross hatching. For simplicity, the first and second subsets are referred to as subsets 301 and 302, respectively. The subsets 301, 302 include subgroups 315 of two adjacent rows. As shown in FIG. 3, the first subset includes every other subgroup 315 beginning from an uppermost row, and the second subset includes the subgroups 315 not in the first subset.

Illustratively, integration period 44 is longer than integration period 42. The integration period 44 can be of a length equal to that of an integration period where image sensor 201 is operated in a conventional manner. The respective signals for each row are indicated in FIG. 4, and other figures herein, by the signal notation followed by the corresponding row number, e.g., RST X and TX X, where X is the row number.

FIG. 4 depicts the operation of image sensor 201, which includes array 200. As a frame can be read out immediately following a previous frame, it should be appreciated that FIG. 4 and other timing diagrams contained herein, show the operation of image sensor 201 where frames are consecutively readout. Accordingly, FIG. 4, and other figures herein, depict portions of several frames. For simplicity, however, the operation of image sensor 201 is described with reference to a singly frame.

The operation as depicted in FIG. 4 occurs as follows. First, pixel cells in Row 0 are selected by applying a corresponding SEL 0 pulse (not shown) to activate a row select transistor 37 (FIG. 1) in each of the pixel cells in Row 0. In the embodiment of FIG. 4, the pixel cells in each row are operated in a similar manner. For simplicity, the operation of pixel cells of array 200 is described with reference to a single pixel cell of a row.

While SEL 0 remains high, RST 0 is applied to activate the gate of the reset transistor 17 to reset the voltage of floating diffusion region 3 to Vaa_pix. A reset voltage signal, $V_{rst}$, representing the charge on the floating diffusion region 3 is applied to the gate of the source follower transistor 27. The signal is readout via column line 40 to the analog signal processing circuit 259 at the timing of SHR (t=t1). In the exemplary embodiment of FIG. 4, where pixel cells of array 200 are configured as depicted in FIG. 1, $V_{rst}$=Vaa_pix.

Next, charge is accumulated during integration period 44, which begins after the first illustrated TX 0 pulse. The accumulated charge is transferred from photodiode 21 to floating diffusion region 3 by applying a pulse TX 0 to activate the gate of the transfer transistor 7. The signal voltages, $V_{photo}$, representing the charge accumulated during integration period 44 is read out to the signal processing circuit 259 at the timing of SHS (t=t2). As described above, the signal processing circuit 259 uses the reset voltage signal, $V_{rst}$, to obtain a differential signal. The differential signal can be obtained during a horizontal blanking period (HBL), and the resulting output signal can be read out during the following horizontal scanning period when HD is high. "VBL" on FIG. 4 denotes a vertical blanking period. To suppress blooming, it is desirable to keep a high RST voltage on the gate of the reset transistor 17, as shown in FIG. 4.

Next, Row 1 is read out in a similar manner to that of Row 0 as shown in FIG. 4. The pixel cells of Row 1 also have an integration period 44 of length N. Therefore, pixel cells of subset 311, which include a full Bayer pattern unit, have the same integration period 44.

After Row 1 is read out, the remaining rows of array 200 are read out sequentially beginning with Row 2. The remaining rows of array 200 are read out in a similar manner to that of Row 0, except that alternating subgroups 301, 302 of two adjacent rows have different integration period lengths N, S. Therefore, as shown in FIG. 4, integration periods 42 for Rows 2, 3, 6, and 7 have a length S, which is illustratively shorter than the length N; and integration periods 44 for Rows 4 and 5 have a length N. In this manner, a dual integration approach with two different lengths of signal integration periods can be realized.

As shown in FIG. 4, for pixel cells with an integration period 42 having a length S, e.g., Row 3, a respective RST 3 signal is pulsed high after readout of $V_{photo}$ from a previous frame. RST 3 remains high at the beginning of the integration period 42. At that time, TX 3 is pulsed high to activate the gate of the transfer transistor 7 and reset the photodiode 21 to a predetermined voltage to begin the integration period 42.

Figure 5:
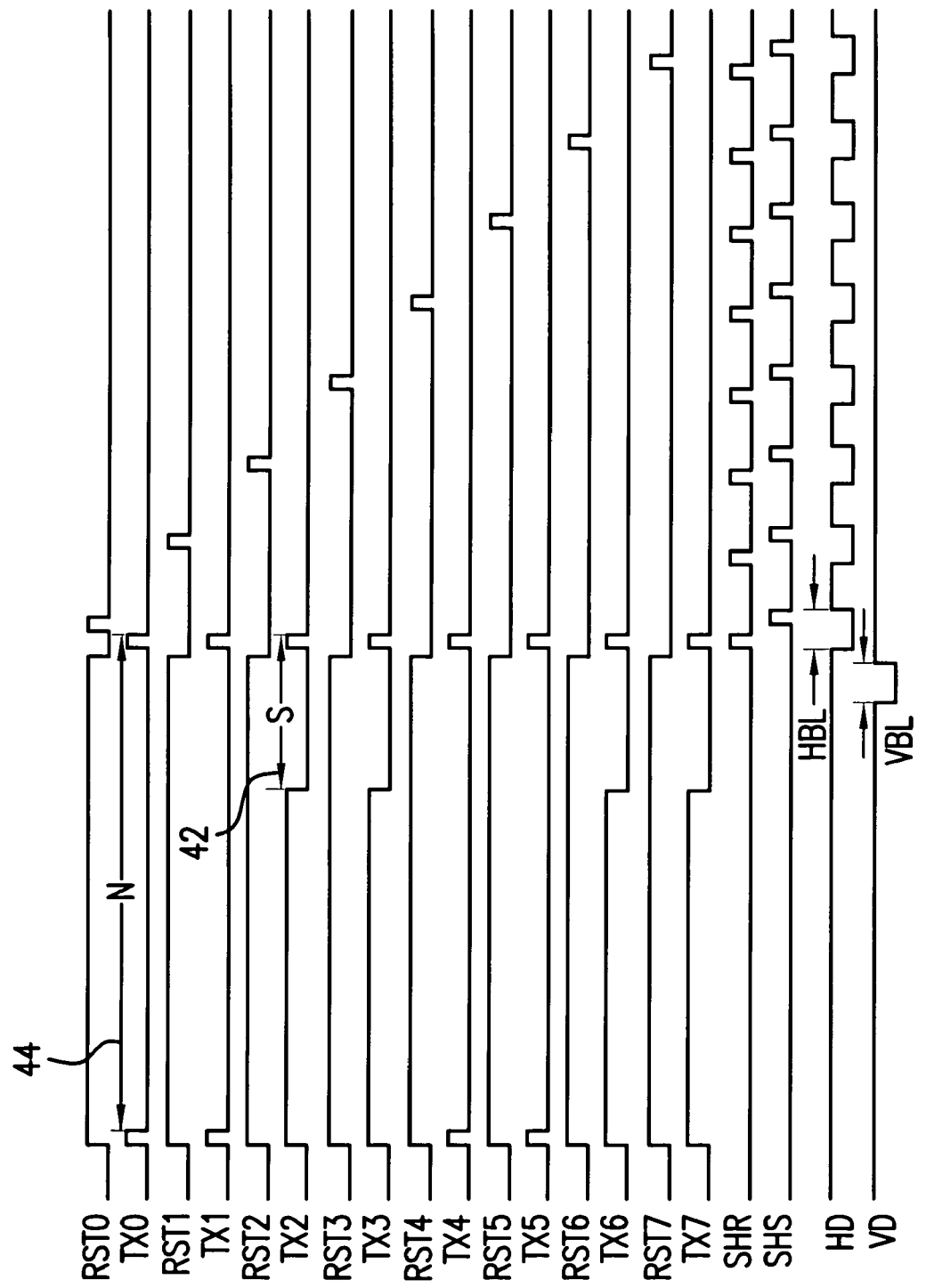
FIG. 5 is a timing diagram illustrating the operation of the image sensor of FIGS. 2 and 3 according to another exemplary embodiment of the invention.

Alternatively, the pixel cells of array 200 can be operated such that all pixel cell of array 200 are reset simultaneously (globally). FIG. 5 illustrates a pulse timing diagram for an exemplary operation of image sensor 201 where pixel cells of array 200 are operated in a global rest mode. For simplicity, a global reset technique is only shown in FIG. 5 with respect to array 200, but it should be appreciated that a global reset technique can be implemented in all embodiments of the invention described herein.

As shown in FIG. 5, all pixel cells of array 200 are reset simultaneously by pulsing corresponding RST X signals high to operate the gates of respective reset transistors 17 to reset respective floating diffusion regions to a predetermined voltage, which is illustratively Vaa_pix. Also, corresponding TX X signals are pulsed high to reset respective photodiodes 21 to a predetermined voltage, in this exemplary embodiment, Vaa_pix.

For pixel cells with integration periods 44 having a length N, e.g., Row 0, a corresponding TX 0 signal is cycled low to begin the integration period having length N while a corresponding RST 0 signal remain high. At the end of the integration period 44, a corresponding RST 0 signal is cycled low. Immediately following, a corresponding TX 0 signal is pulsed high to activate the gate of transfer transistor to transfer charge accumulated by photodiode 21 to floating diffusion region 3.

For pixel cells with integration periods 42 having a length S, e.g., Row 2, a corresponding RST 2 and TX 2 signal remain high at the beginning of the integration period 42. At that time, TX 2 signals is cycled low to begin the integration period 42. At the end of the integration period 42, a corresponding TX 2 signal is pulsed high to activate respective gate of transfer transistor 7 to transfer charge accumulated by photodiode 21 to floating diffusion region 3.

As shown in FIG. 5, integration periods 42, 44 for all pixel cells of array 200 end at a same time when charge accumulated by respective photodiodes 21 is transferred to respective floating diffusion regions 3. Subsequently, the charge on floating diffusion regions 3 is readout row by row as shown in FIG. 5.

Figure 6:
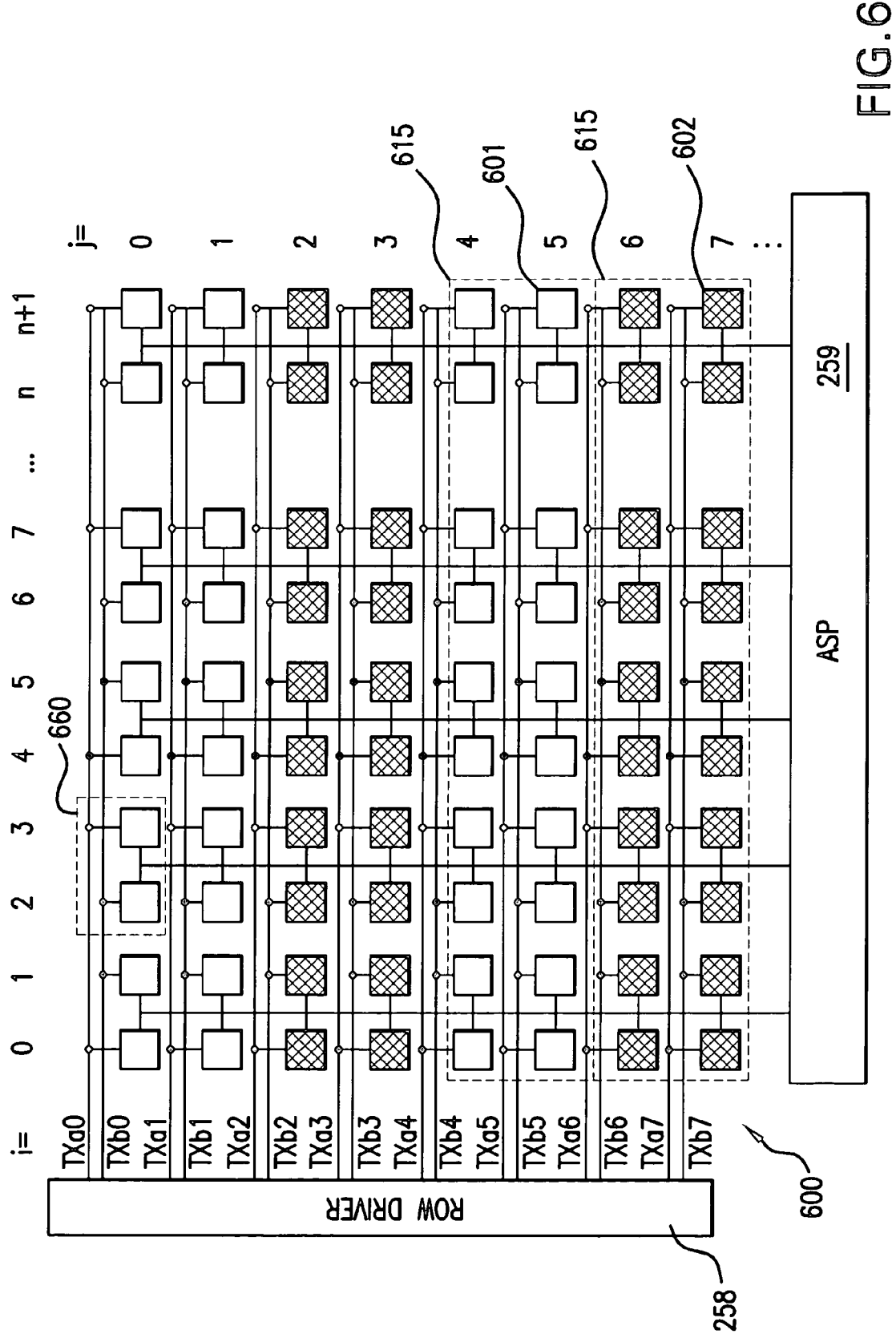
FIG. 6 is a block diagram illustrating a portion of the image sensor of FIG. 2 according to another exemplary embodiment of the invention.
Figure 7:
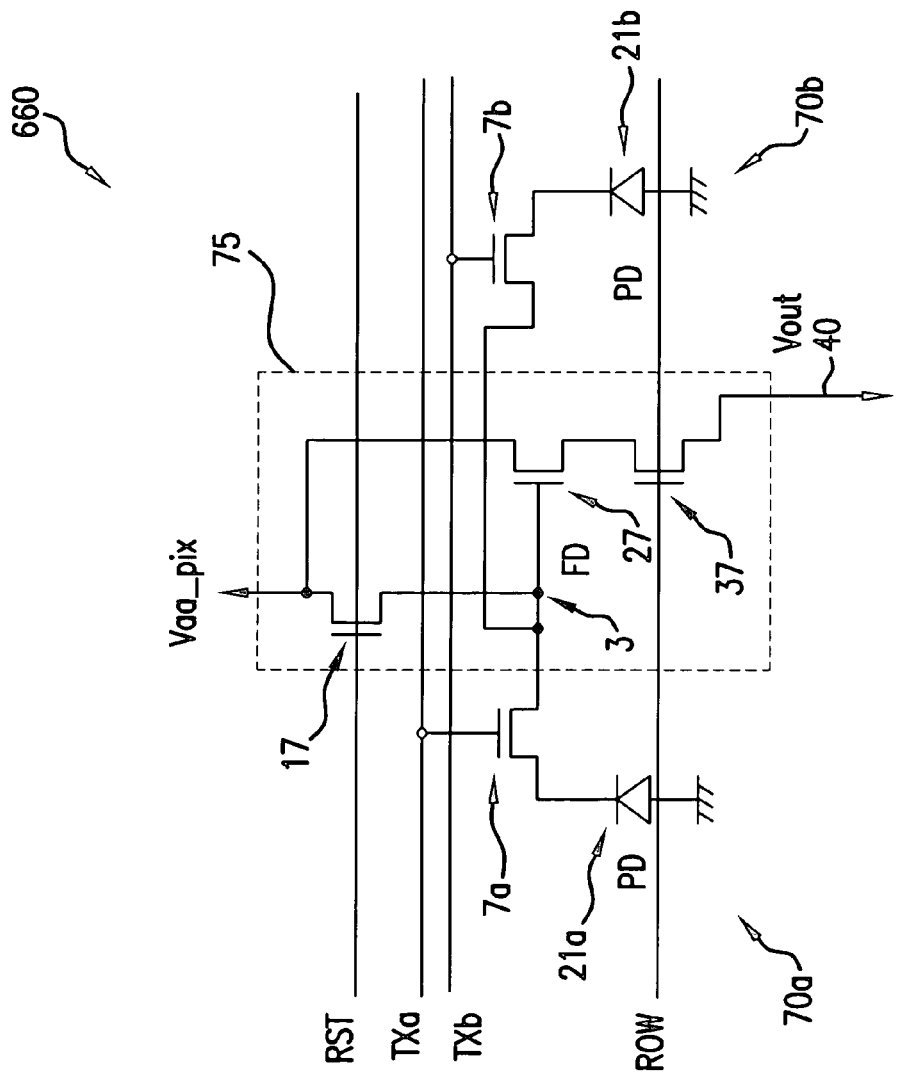
FIG. 7 is a schematic diagram of pixel cells having a shared column configuration, which can be implemented in the array of FIG. 6.

In another alternative exemplary embodiment, image sensor 201 can include an array of pixel cells 600, as shown in FIG. 6, instead of array 200 (FIG. 3). Array 600 is similar to array 200 except that pixel cells of array 600 have a shared column configuration. Accordingly, pixel cells in a pixel unit 660 share readout circuitry 75, as shown in FIG. 7. Also, there are two subsets of pixel cells in array 600. The first subset includes pixel cells operated with an integration period 44 (FIG. 8) having length N, denoted by pixel cells 601 without cross hatching, and the second subset includes pixel cells operated with an integration period 42 (FIG. 8) having length S, denoted by pixel cells 602 with cross hatching. For simplicity, the first and second subsets are referred to as subsets 601 and 602, respectively. The subsets 601, 602 include subgroups 615 of two adjacent rows. As shown in FIG. 6, the subset 601 includes every other subgroup 615 beginning from an uppermost row, and the subset 602 includes the subgroups 615 not in the subset 601.

FIG. 7 depicts pixel cells 70a and 70b having a shared column configuration in array 600. Pixel cells 70a, 70b each include a photo-conversion device, for example a photodiode 21a and 21b, respectively. Also, pixel cells 70a and 70b each respectively include a transfer transistor 7a and 7b controlled by a TXa and TXb signal, respectively. Both pixel cells 70a and 70b share readout circuitry 75, which illustratively includes a floating diffusion region 3, source follower transistor 27 and row select transistor 37. The components of pixel cells 70a and 70b perform the same functions as the corresponding components described above in connection with FIG. 1. The operation of array 600, however, is changed to accommodate the shared column configuration.

Figure 8:
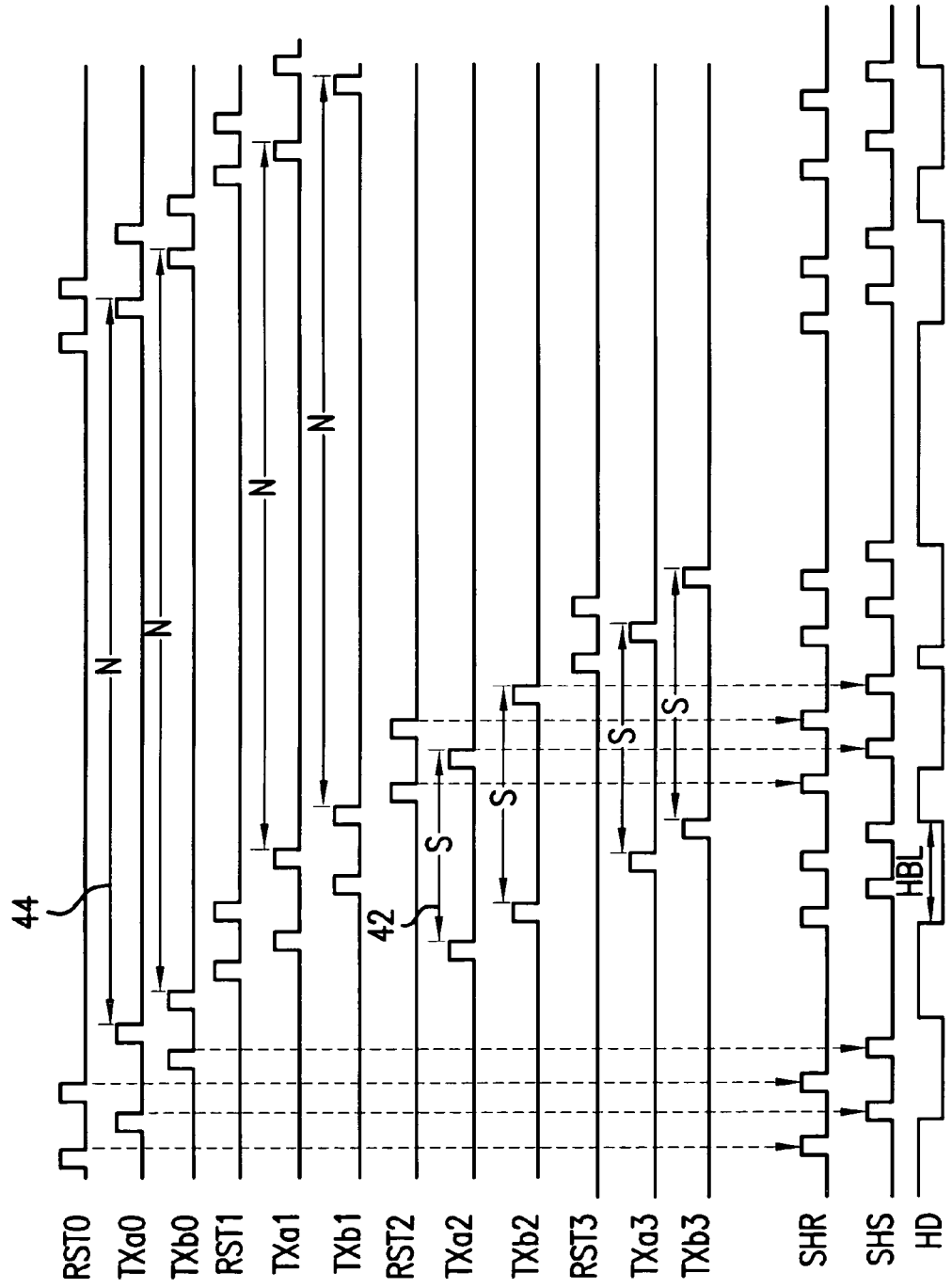
FIG. 8 is a timing diagram illustrating the operation of the image sensor of FIGS. 2 and 6 according to another exemplary embodiment of the invention.

FIG. 8 depicts exemplary timing for the operation of image sensor 201 including array 600. First, pixel cells in Row 0 are selected by applying a corresponding SEL 0 pulse (not shown) to activate a row select transistor 37 (FIG. 1) in each of the pixel cells in Row 0. In the embodiment of FIG. 8, pixel units 660 of each row are operated in a similar manner. For simplicity, the operation of pixel units 660 of array 600 is described with reference to a single pixel unit 660 of a row.

While SEL 0 remains high, RST 0 is applied to activate the gate of the reset transistor 17 to reset the voltage of floating diffusion region 3 to Vaa_pix. A reset voltage signal, $V_{rst}$, representing the charge on the floating diffusion region 3 is applied to the gate of the source follower transistor 27 and readout via column line 40 to the analog signal processing circuit 259 as SHR is pulsed high to sample and hold $V_{rst}$. In the exemplary embodiment of FIG. 6, where pixel cells of array 600 are configured as depicted in FIG. 7, $V_{rst}$=Vaa_pix.

As shown in FIG. 8, pixel cells of Row 0 accumulate charge during integration period 44, which has a length N. The integration period 44 begins after charge from a previous frame is read out and as TXa 0 or TXb 0 goes low. Next, charge accumulated during an integration period 44 having a length N is transferred from photodiode 21a to floating diffusion region 3 by applying a pulse TXa 0 to activate the gate of the transfer transistor 7a. The signal voltage, $V_{photo-a}$, representing the charge accumulated by photodiode 21a during integration period 44 is read out to the signal processing circuit 259 as SHS is pulsed high to sample and hold $V_{photo-a}$. As shown in FIG. 8, this procedure can be performed during the first half of a horizontal blanking period HBL.

After charge accumulated by photodiode 21a is readout, RST 0 is pulsed high to activate the gate of the reset transistor 17 to reset the floating diffusion region 3 to Vaa_pix and a reset signal, $V_{rst}$, is applied to the gate of the source follower transistor 27 and readout via column line 40 to the analog signal processing circuit 259 as SHR is pulsed high to sample and hold $V_{rst}$.

Then, the charge accumulated by photodiode 21b during its integration period 44 is readout and transferred to floating diffusion region 3 by applying a pulse TXb 0 to activate the gate of the transfer transistor 7b. The signal voltage, $V_{photo-b}$, representing the charge accumulated by photodiode 21b during integration period 44 is read out to the signal processing circuit 259 as SHS is pulsed high to sample and hold $V_{photo-b}$. As described above, the signal processing circuit 259 uses the reset voltage signal, $V_{rst}$, to obtain a differential signal. As shown in FIG. 8, this procedure can be performed during the latter half of a horizontal blanking period HBL, and the resulting output signal in a row can be read out during a following horizontal scanning period when HD is high.

Row 1 is read out in a similar manner to that of Row 0 as shown in FIG. 8. Pixel cells of Row 1 also have an integration period 44 with a length N. After Row 1 is read out, the remaining rows of array 600 are read out sequentially beginning with Row 2. The remaining rows of array 600 are is also read out in a similar manner to that of Row 0, except that alternating subsets of two adjacent rows have different integration period lengths N, S. Therefore, as shown in FIG. 8, integration periods 42 for Rows 2, 3, 6, and 7 have a length S, which is illustratively shorter than the length N; and integration periods 44 for Rows 4 and 5 have a length N. In this manner, a dual integration period approach with two different lengths of signal integration periods can be realized.

As shown in FIG. 8, in pixel cells with an integration period 42 having length S, e.g., Row 2, a respective TXa 2, TXb 2 signal is pulsed high to activate the gate of the transfer transistor 7a, 7b and reset the photodiode 21a, 21b to a predetermined voltage, which is Vaa_pix in the exemplary embodiment of FIG. 6, to begin the integration period 42. At the end of the integration period 42, TXa, TXb, SHS are used to read out $V_{photo-a}$, $V_{photo-b}$ for Row 2.

Figure 9:
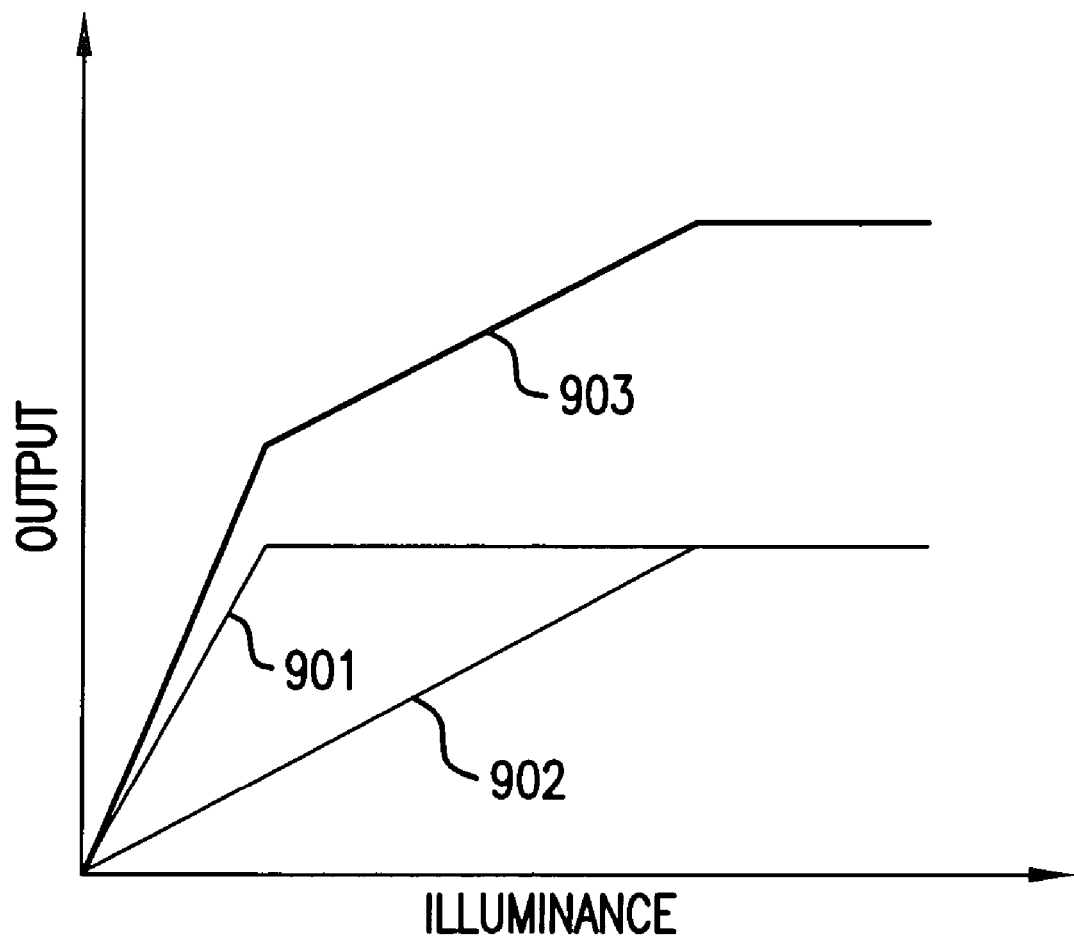
FIG. 9 is a graph illustrating the light transfer characteristics of the image sensor operated as described above in connection with FIGS. 4-8.

FIG. 9 is a graph depicting the light transfer characteristics of image sensor 201 operated as described above in connection with FIGS. 4-8. Pixel cells having a shorter integration period 42, represented by line 902, have an output corresponding to a wider range of luminance than do the pixel cells having a longer integration period 44, represented by line 901. The outputs from pixel cells having both lengths of integration periods 44, 42 are used to achieve a synthetic output and a wide dynamic range.

A simple procedure to achieve a synthetic output is to add two pixel signals. An original signal output at column i and row j is expressed as S(i,j). The synthesized signal output R(i,j) can be expressed as follows:

$$R(i,j)=S(i,j)+S(i,j+2) \text{ for } j=0,1,4,5,\ldots n, n+1 \quad \text{(equation 1)}$$

$$R(i,j)=S(i,j)+S(i,j-2) \text{ for } j=2,3,5,7,\ldots n', n'+1 \quad \text{(equation 2)}$$

Where n and n' are row numbers following the respective sequences provided for equations 1 and 2.

As the color filters of array 200, 600 are configured in a Bayer pattern, the synthesized signal output R(i,j) is the sum of the same color signal of S(i,j) and S(i,j+2). For example, in array 200 of FIG. 3, the pixel cell corresponding to i=0 and j=0 and the pixel cell corresponding to i=0 and j=2 are each associated with a green color filter. Accordingly, to achieve a synthetic signal R(0,0), a green color signal S(0,0) is added to a green color signal S(0,2). This procedure achieves a wide dynamic range, but degrades a vertical resolution by a half of its original resolution. If sensor array 200, 600 has a sufficient number of pixel cells, however, such as a 4 Mega pixel array, a high quality image can still be achieved.

Alternatively, to avoid degradation of spatial resolution and achieve a wide dynamic range, an interpolation procedure can be used. An original signal output at column i and row j is expressed as S(i,j). The synthesized signal output R(i,j) can be achieved as a linear combination of same color signals, and expressed as follows:

$$R(i,j)=A^*S(i,j)+B^*(S(i,j-2)+S(i,j+2)) \text{ for } j=0,1,4,5,\ldots n, n+1 \quad \text{(equation 3)}$$

$$R(i,j)=C^*S(i,j)+D^*(S(i,j-2)+S(i,j+2)) \text{ for } j=2,3,6, 7,\ldots n', n'+1 \quad \text{(equation 4)}$$

Where n and n' are row numbers following the respective sequences provided for equations 3 and 4. For simplicity, A=C=0.5 and B=D=0.25, but parameters A-D can be other values.

As shown in equations 3 and 4, parameters A-D provide the relative proportions of the signals that make up a synthetic signal R(i,j). Under low light conditions where the signal does not saturate within the longer integration period 44, A=1, B=0, C=0, D=0.5 are preferable, because there is a high signal to noise ratio. The parameters A through D can be changed continuously depending upon the light intensity. Also, the integration periods 44, 42 can be changed adaptively depending upon the light intensity of the imaged scene. For example, at low light levels, S can be set to equal N and as light levels increase, S can be reduced as compared to N.

Figure 10:
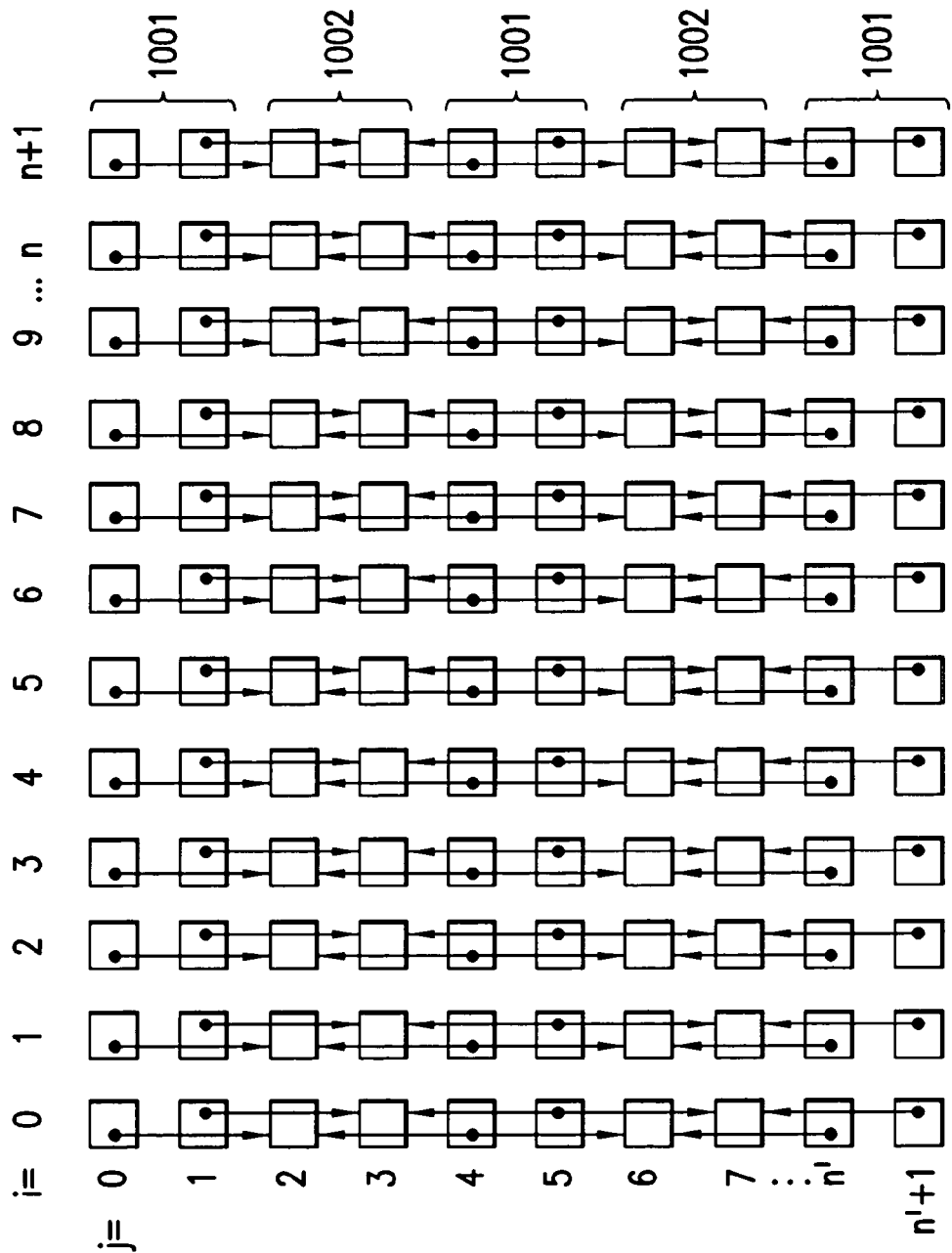
FIG. 10 is a block diagram illustrating interpolation for pixel cells of the image sensors of FIGS. 2, 3, and 6 according to another exemplary embodiment of the invention.

FIG. 10 shows a simple exemplary embodiment of interpolation using equations 3 and 4 above where pixel cells of array 200, 600 have a same integration period length, i.e., S=N. In the exemplary embodiment of FIG. 10, the pixel cell corresponding to i=0 and j=3, the pixel cell corresponding to i=0 and j=5, and the pixel cell corresponding to i=0 and j=7 are each associated with a blue color filter. Accordingly, to achieve a synthetic signal R(0,5), the signals S(0,3), S(0,5), and S(0,7) are used. By interpolating from and to same color signals, good color characteristics can be obtained without significant color cross talk.

After interpolation is performed, two sets of image data, original signals S(i,j) and synthetic signals R(i,j), are processed by image processor 250 to reproduce a wide dynamic range image having a resulting light transfer characteristic as depicted by line 903 in FIG. 9.

Figure 11:
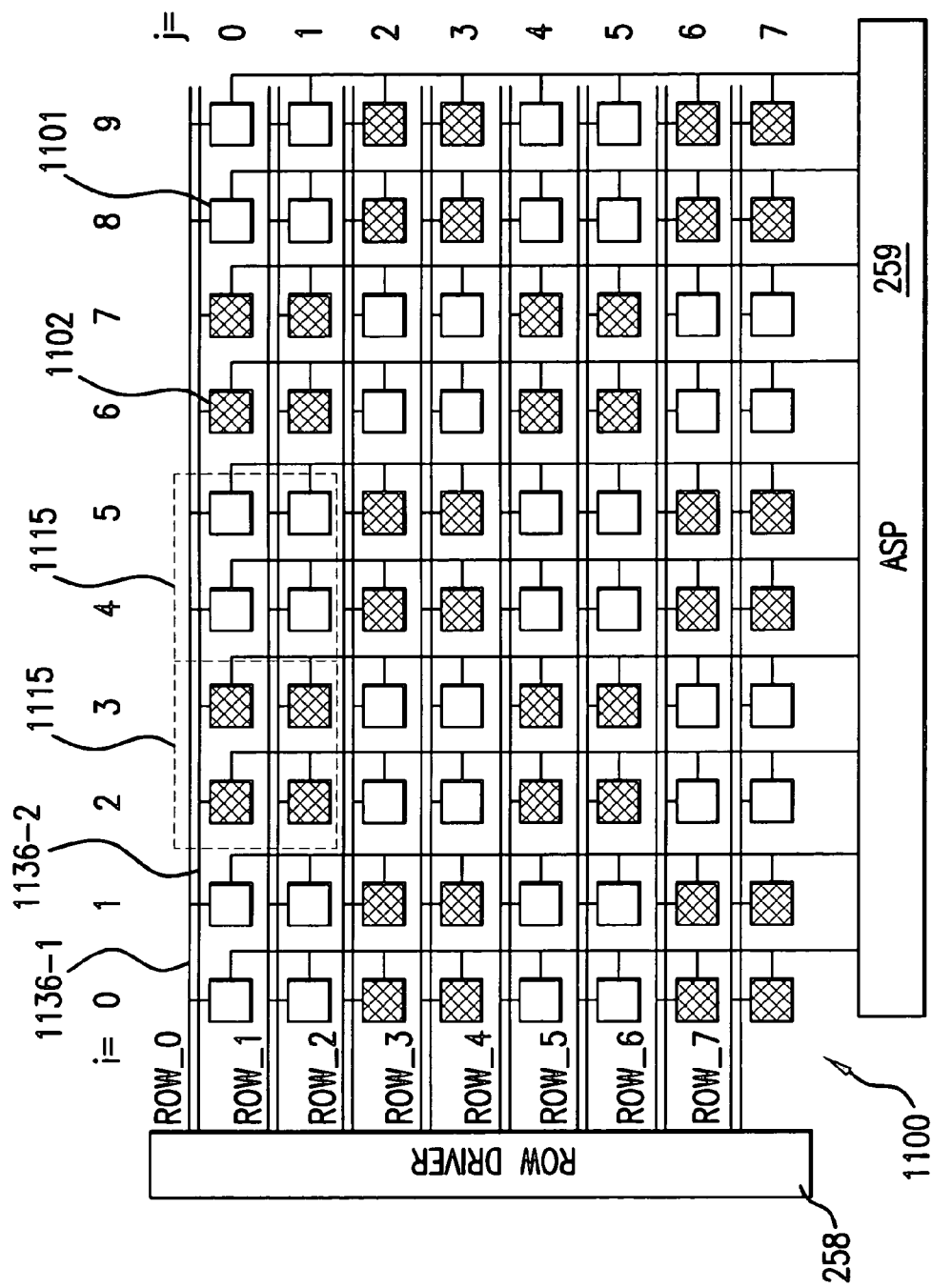
FIG. 11 is a block diagram illustrating a portion of the image sensor of FIG. 2 according to another exemplary embodiment of the invention.

FIG. 11 depicts an array 1100, which can be implemented in image sensor 201 (FIG. 2) and operated according to another exemplary embodiment of the invention. Pixel cells in the embodiment of FIG. 11 are divided into two subsets: subset 1101 depicted as pixel cells without cross hatching and 1102 depicted as pixel cells with cross hatching. During operation of sensor 201, as shown in FIG. 12, subset 1101 has an integration period 44 with a length N, and subset 1102 has an integration period 42 with a length S.

Pixel cells of subset 1101 and 1102 are arranged such that the subsets include subgroups 1115 of four pixel cells spanning two adjacent rows and two adjacent columns. The subset 1101 includes every other subgroup 1115 and subset 1102 includes subgroups 1115 that are not in subset 1101, such that the subsets form a checker board-like (zigzag) pattern as shown in FIG. 11. In the exemplary embodiment of FIG. 11, array 1100 includes color filters associated with each pixel cell and arranged in a Bayer pattern. Therefore, each subgroup includes four color filters which make up a Bayer pattern unit. This arrangement enables good balancing of resolution in both the horizontal and vertical directions.

As shown in FIG. 11, there are two row select lines 1136-1 and 1136-2 respectively associated with each row of array 1100. Row select lines 1136-1 and 1136-2 respectively carry signals to pixel cells of subsets 1101 and 1102 to activate row select transistor 37 (FIG. 1) in respective pixel cells for readout of those pixel cells. An image sensor 201, which includes array 1100 of FIG. 11, can be operated as described above in connection with FIGS. 4-8, except that pixel cells of each row are read out in two readout processes, one readout process includes reading out pixel cells of subset 1101, which have an integration period 44, the second readout process includes reading out pixel cells of subset 1102, which have an integration period 42. The outputs from pixel cells having integration periods 44, 42 are used to achieve a synthetic output and a wide dynamic range, as described above.

Figure 12:
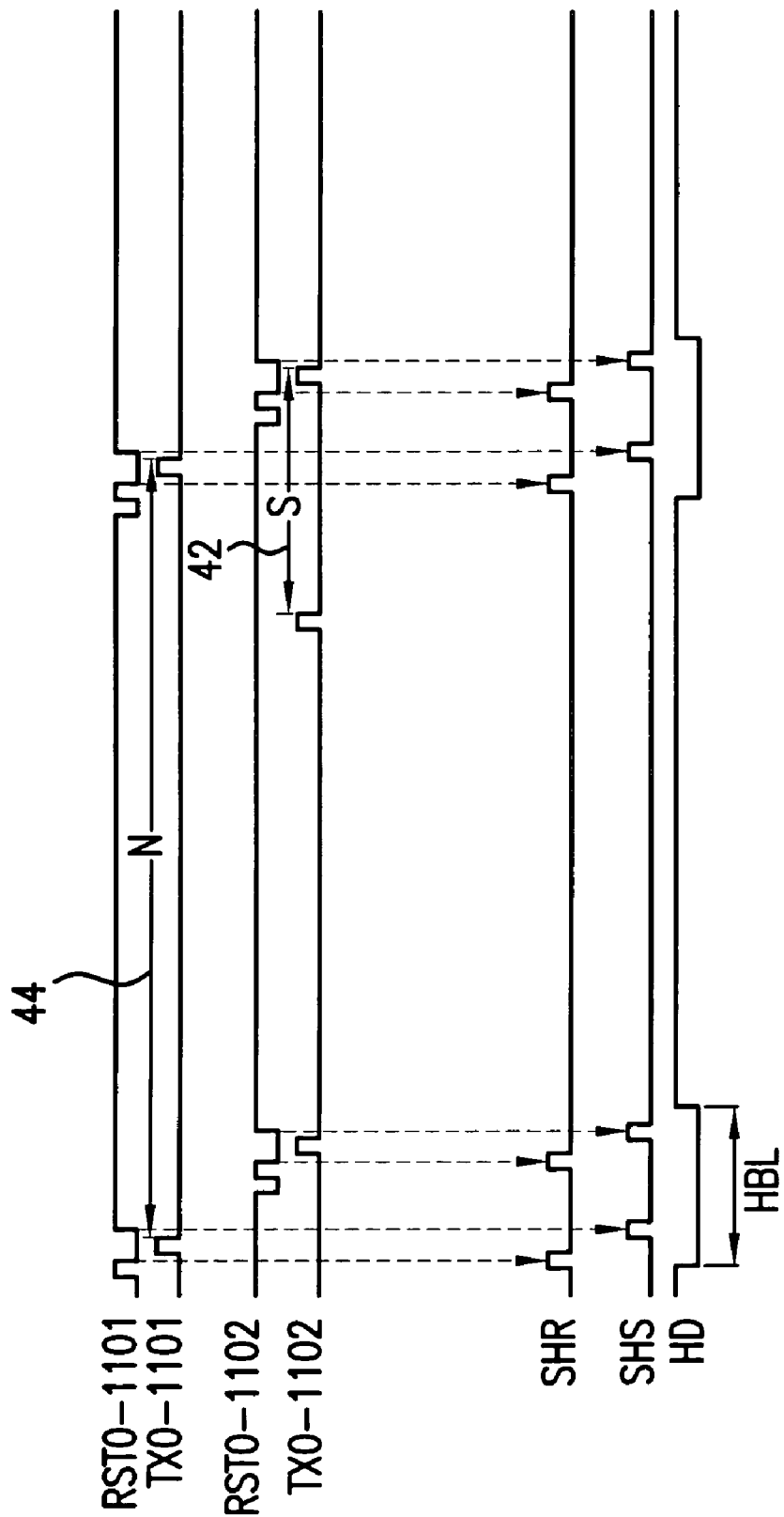
FIG. 12 is a timing diagram illustrating the operation of the image sensor of FIGS. 2 and 11 according to another exemplary embodiment of the invention.

FIG. 12 is an exemplary timing diagram depicting the operation of pixel cells of Row 0 (of array 1100). The respective signals for each row are indicated in FIG. 11, and other subsequent figures herein, by the signal notation followed by the corresponding row number, e.g., RST X-W and TX X, where X is the row number and W is the subset number. For readout of pixel cells in Row 0, first, pixel cells of subset 1101 are selected by applying a corresponding SEL 0-1101 pulse (not shown) to activate a row select transistor 37 (FIG. 1) in each of the pixel cells in subset 1101 of Row 0. In the embodiment of FIG. 12, each row is operated in a similar manner. For simplicity, the operation of array 1100 is described with reference to a single row.

While SEL 0-1101 remains high, RST 0-1101 is applied to activate the gate of the reset transistor 17 to reset the voltage of floating diffusion region 3 to Vaa_pix. A reset voltage signal, $V_{rst}$, representing the charge on the floating diffusion region 3 is applied to the gate of the source follower transistor 27 and readout via column line 40. As RST 0-1101 goes low, SHR is pulsed high to sample and hold $V_{rst}$. In the exemplary embodiment of FIG. 12, where pixel cells of array 1100 are configured as depicted in FIG. 1, $V_{rst}$=Vaa_pix.

Pixel cells of subset 1101 in Row 0 accumulate charge during integration period 44, which has a length N. The integration period 44 begins as TX 0-1101 goes low, ending the readout of a previous frame. At the end of integration period 44, charge is transferred from photodiode 21 to floating diffusion region 3 by applying a pulse TX 0-1101 to activate the gate of the transfer transistor 7. The signal voltage, $V_{photo1101}$, representing the charge accumulated during integration period 44 is applied to the gate of the source follower transistor 27 and read out via column line 40. As TX 0-1101 goes low, SHS goes is pulsed high to sample and hold $V_{photo1101}$. As shown in FIG. 12, this procedure can be performed during the first half of a horizontal blanking period HBL.

Next, pixel cells of subset 1102 are read out. Pixel cells in Row 0 of subset 1102 are selected by applying a corresponding SEL 0-1102 pulse (not shown) to activate a row select transistor 37 in each of the pixel cells in Row 0 of subset 1102. Pixel cells of subset 1102 are read out in a similar manner to that of pixel cells of subset 1101.

For charge integration, pixel cells of subset 1102 are operated to have a shorter integration period than pixel cells of subset 1101. As TX 0-1102 goes low after readout of $V_{photo1102}$ from a previous frame, a RST 0-1102 signal is pulsed high. RST 0-1102 remains high at the beginning of the integration period 42 of length S. At that time, RST 0-1102 is cycled to low and TX 0-1102 is pulsed high to activate the gate of the transfer transistor 7 and reset the photodiode 21 to a predetermined voltage, which is Vaa_pix in the exemplary embodiment of FIG. 12. As TX 0-1102 goes low the integration period 42 begins. At the end of integration period 42, TX 0-1102 is pulsed high and the charge can be read out at SHS. This procedure can be perfumed during the latter half of a horizontal blanking period HBL, and the resulting output signal in a row can be read out during a following horizontal scanning period when HD is high, as shown in FIG. 12.

Figure 13:
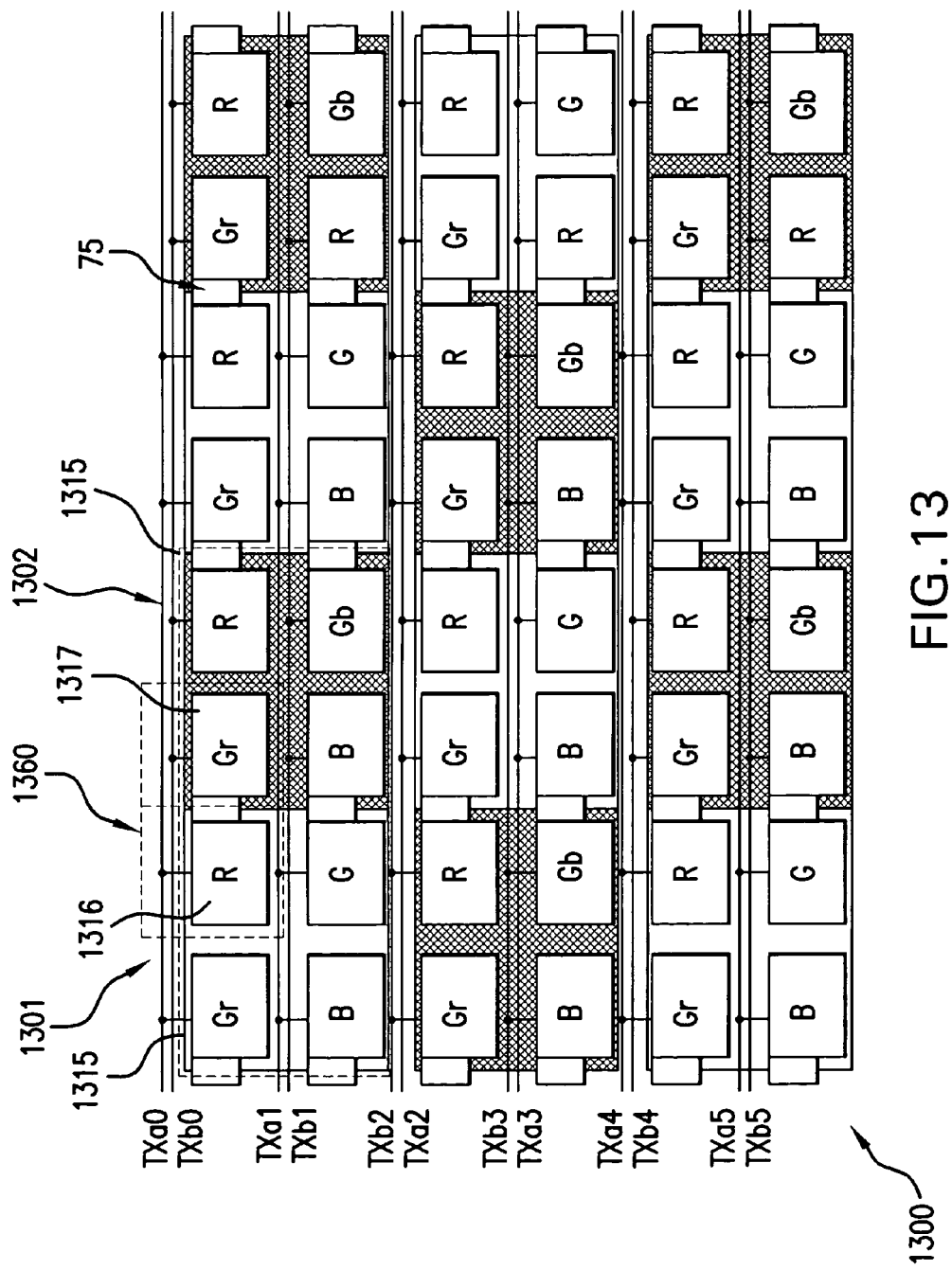
FIG. 13 is a block diagram illustrating a portion of the image sensor of FIG. 2 according to another exemplary embodiment of the invention.

The embodiment of FIGS. 11-12 can be adapted for an array having pixel cells with a shared column configuration. FIG. 13 shows an array 1300 including pixel cells having a shared column configuration. Array 1300 can be implemented in image sensor 201. Array 1300 can be operated to realize a wide dynamic range with high density and well balanced spatial resolution.

Similar to array 1100 (FIG. 11), array 1300 includes two subsets, subset 1301, depicted as including pixel cells without a shaded background, and subset 1302, depicted as including pixel cells with a shaded background. The subsets 1301, 1302 include subgroups 1315 of four pixel cells spanning two adjacent rows and two adjacent columns. The subsets 1301, 1302 form a checker board-like (zigzag) pattern as shown in FIG. 13. Array 1300 is configured such that pixel cells of the subset 1301 have an integration period 44 with a length N, and pixels cells of subset 1302 have an integration period 42 with a length S as shown in FIG. 14.

In the exemplary embodiment of FIG. 13, array 1300 includes color filters associated with each pixel cell and arranged in a Bayer pattern. Therefore, each subgroup 1315 includes four color filters which make up a Bayer pattern unit. Pixel cells of array 1300 are configured as shown in FIG. 7, such that two adjacent pixel cells within a row share readout circuitry 75, and make up a shared column pixel unit 1360. Illustratively, as shown in FIG. 13, one pixel cell 1316 of a shared column pixel unit 1360 is part of subset 1301 and the other pixel cell 1317 is part of subset 1302. Also, pixel cells of subset 1301 can be configured to include only pixel cells 70a, while subset 1302 can be configured to include only pixel cells 70b. In such a case, pixel cells 70a can be operated to have an integration period 44 and pixel cells 70b can be operated to have an integration period 42.

Figure 14:
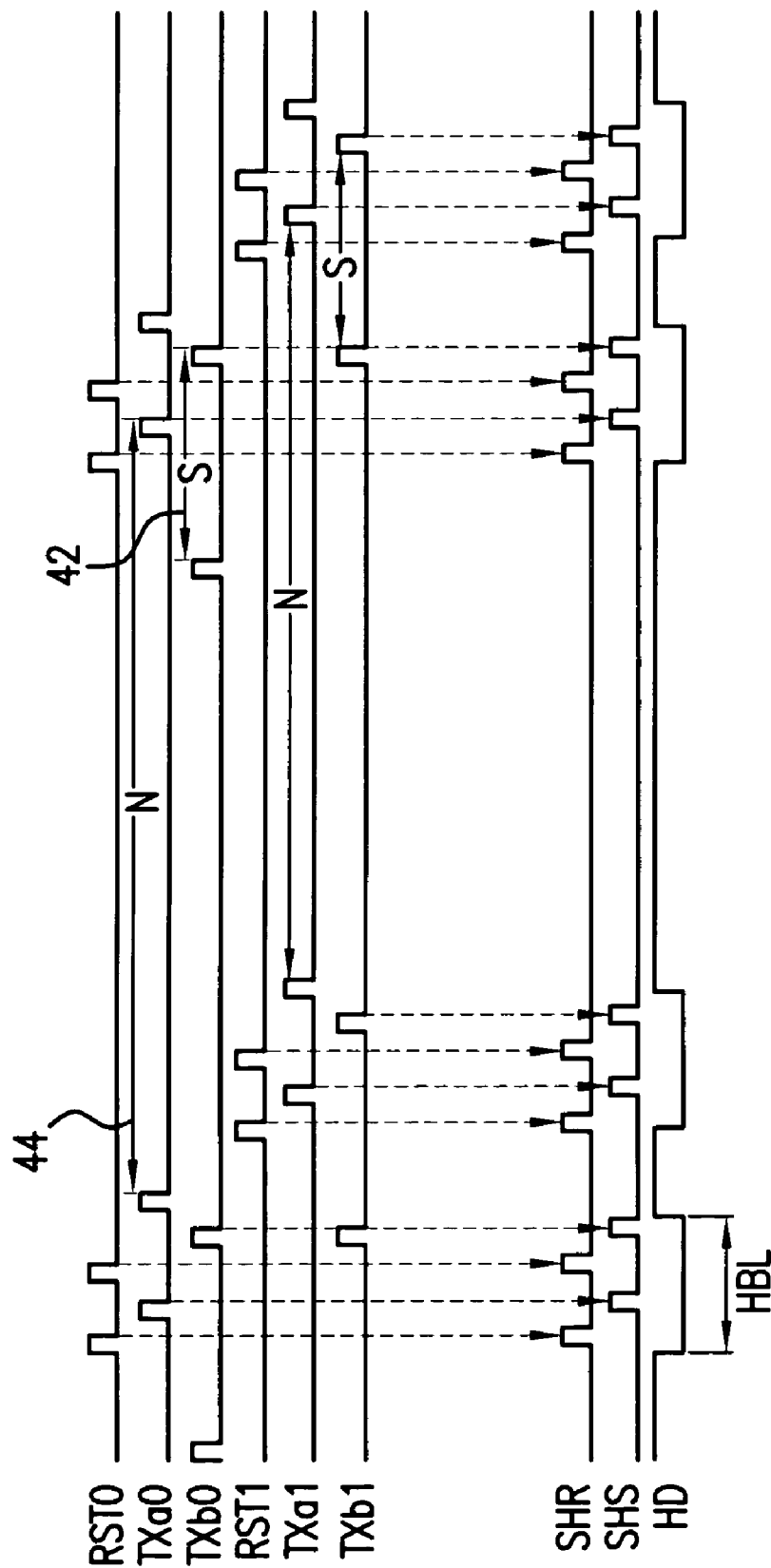
FIG. 14 is a timing diagram illustrating the operation of the image sensor of FIGS. 2 and 13 according to another exemplary embodiment of the invention.

FIG. 14 is a timing diagram depicting an exemplary operation of array 1300. First, pixel cells in Row 0 are selected by applying a corresponding SEL 0 pulse (not shown) to activate a row select transistor 37 (FIG. 1) in each of the pixel cells in Row 0. In the embodiment of FIG. 14, shared column pixel units 1360 of each row are operated in a similar manner. For simplicity, the operation of units 1360 of array 1300 is described with reference to a single shared column pixel unit 1360 of a row.

While SEL 0 remains high, RST 0 is applied to activate the gate of the reset transistor 17 to reset the voltage of floating diffusion region 3 to Vaa_pix. A reset voltage signal, $V_{rst}$, representing the charge on the floating diffusion region 3 is applied to the gate of the source follower transistor 27 and readout via column line 40 to the analog signal processing circuit 259 as SHR is pulsed high to sample and hold $V_{rst}$. In the exemplary embodiment of FIG. 13, where pixel cells of array 1300 are configured as depicted in FIG. 7, $V_{rst}$=Vaa_pix.

Pixel cells of subset 1301 in Row 1 accumulate charge during an integration period 44, which has a length N. The integration period 44 begins as TXa 0 goes low, ending the readout of a previous frame. Charge accumulated during integration period 44 is transferred from photodiode 21a to floating diffusion region 3 by applying a pulse TXa 0 to activate the gate of the transfer transistor 7a. The signal voltage, $V_{photo-a}$, representing the charge accumulated by photodiode 21a during integration period 44 is read out to the signal processing circuit 259 as SHS is pulsed high to sample and hold $V_{photo-a}$. As shown in FIG. 14, this procedure can be performed during the first half of a horizontal blanking period HBL.

After charge accumulated by photodiode 21a is readout, RST 0 is pulsed high to activate the gate of the reset transistor 17 to reset the floating diffusion region 3 to Vaa_pix and a reset signal, $V_{rst}$, is applied to the gate of the source follower transistor 27 and readout via column line 40 to the analog signal processing circuit 259 as SHR is pulsed high to sample and hold $V_{rst}$.

As shown in FIG. 14, in pixel cells with integration period 42, a respective TXb signal is pulsed high to activate the gate of the transfer transistor 7b and reset the photodiode 21b to a predetermined voltage, which is illustratively Vaa_pix, to begin the integration period 42.

Charge accumulated by photodiode 21b during an integration period 42 with length S is readout similarly to the readout of $V_{photo-a}$, described above. The charge accumulated by photodiode 21b is transferred from photodiode 21b to floating diffusion region 3 by applying a pulse TXb 0 to activate the gate of the transfer transistor 7b. The signal voltage, $V_{photo-b}$, representing the charge accumulated by photodiode 21b during integration period 42 is read out to the signal processing circuit 259 as SHS is pulsed high to sample and hold $V_{photo-b}$. As shown in FIG. 14, this procedure can be performed during the latter half of a horizontal blanking period HBL. The resulting output signal in a row can be read out during a following horizontal scanning period when HD is high. The signal processing circuit 259 uses the reset voltage signal, $V_{rst}$, to obtain a differential signal as described above.

Row 1 and the remaining rows of array 1300 are read out in a similar manner to that of Row 0, as shown in FIG. 14. In this manner, a dual integration period approach with two different lengths of signal integration periods can be realized.

For the embodiments described above in connection with FIGS. 11-14, the outputs from pixel cells having both lengths N, S of integration periods 44, 42 are used to achieve a synthetic output and a wide dynamic range. A simple procedure to achieve a synthetic output is to add two pixel signals. An original signal output at column i and row j is expressed as S(i,j). The synthesized signal output R(i,j) can be expressed as follows:

$$R(i,j)=S(i,j)+S(i,j+2) \text{ for } j=0,1,4,5, \ldots n, n+1 \quad \text{(equation 5)}$$

$$R(i,j)=S(i,j)+S(i,j-2) \text{ for } j=2,3,6,7, \ldots n', n'+1 \quad \text{(equation 6)}$$

Where n and n' are row numbers following the respective sequences provided for equations 5 and 6. This procedure achieves a wide dynamic range, but it degrades an original spatial resolution.

To preserve the original spatial resolution and adjust output levels between pixels, an interpolation procedure can be used. An original signal output at column i and row j is expressed as S(i,j). The synthesized signal output R(i,j) can be expressed as follows:

$$R(i,j)=A*S(i,j)+B*(S(i-2,j)+S(i+2,j)+S(i,j-2)+S(i,j+2)) \text{ for Pixel}(i,j): \text{Subset } 1101, 1301 \quad \text{(equation 7)}$$

$$R(i,j)=C*S(i,j)+D*(S(i-2,j)+S(i+2,j)+S(i,j-2)+S(i,j+2)) \text{ for Pixel}(i,j): \text{Subset } 1102, 1302 \quad \text{(equation 8)}$$

Where A=C=0.5 and B=D=0.125 for simplicity. As shown in equations 7 and 8, parameters A to D provide the relative proportions of the signals that make up a synthetic signal R(i,j). Under low light conditions where the signal does not saturate for integration period 44, A=1, B=0, C=0, D=0.25 are preferable, because of the high signal to noise ratio. The parameters A to D can be changed continuously depending upon the light intensity. Also, the integration periods 44, 42 can be changed adaptively depending upon the light intensity. For example, at low light levels, S can be set to equal N and as light levels increase, S can be reduced as compared to N.

Figure 15:
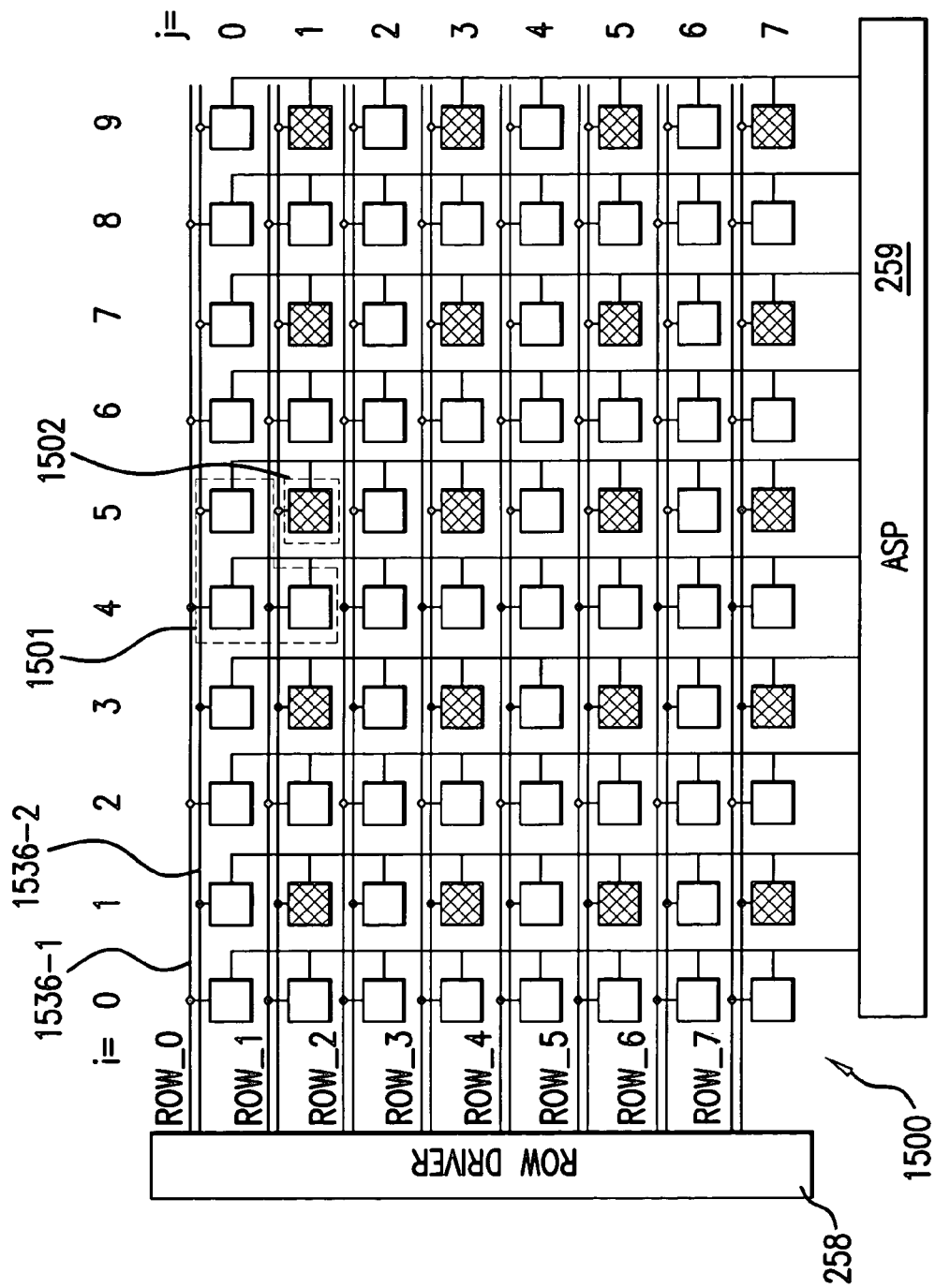
FIG. 15 is a block diagram illustrating a portion of the image sensor of FIG. 2 according to another exemplary embodiment of the invention.

FIG. 15 depicts an array 1500, which can be implemented in image sensor 201 (FIG. 2) and operated according to another exemplary embodiment of the invention. Pixel cells in the embodiment of FIG. 15 can have a single (FIG. 1) or shared column configuration (FIG. 7) and are divided into two subsets: subset 1501, which is depicted as including pixel cells without cross hatching, and subset 1502, which is depicted as including pixel cells with cross hatching. During operation of sensor 201, subset 1501 has an integration period with length N, and subset 1502 has an integration period with length S.

Pixel cells of subset 1501 are arranged such that subset 1501 includes three pixel cells of a Bayer pattern unit, each associated with a different colored filter. For example, where the color filter array includes color filters corresponding to red, green, and blue, a Bayer pattern unit can include a two pixel cells respectively associated with red and green filters in a row directly above two pixel cells respectively associated with blue and green color filters. Therefore, as shown in FIG. 15, subset 1501 includes three pixel cells respectively associated with red, green, and blue color filters. Pixel cells of subset 1502 include a pixel cell associated with the redundant color filter in a Bayer pattern unit, illustratively green.

As shown in FIG. 15, array 1500 can have two row select lines 1536-1 and 1536-2 respectively associated with each of the rows of array 1500. Alternatively, rows including only pixel cells of subset 1501 can have a single row select line, while rows including pixel cells of subsets 1501 and 1502 can have two row select lines. Pixel cells of array 1500 can be read out in a similar manner to pixel cells of arrays 200, 600, 1100, and/or 1300, described above with respect to FIGS. 2-14.

Further, the operation of array 1500 can be adapted to achieve a different integration period 44, 42 for each subset 1501, 1502 as described above with respect to FIGS. 2-14. Accordingly, for simplicity, specific examples of timing for the operation of array 1500 are not shown.

As is known in the art, there are two green color filters in a Bayer pattern unit to approximate a spectral response of the human eye. In the exemplary embodiment of FIG. 15, the signal of pixel cells of subset 1502 can be treated as a luminance signal without chrominance signals. The pixel cells of subset 1502 can be used as the luminance response for pixel cells of subset 1501. Thereby, especially under conditions of strong illumination such that the pixel cells of subset 1501 are saturated, a wide dynamic range is achieved.

Figure 16:
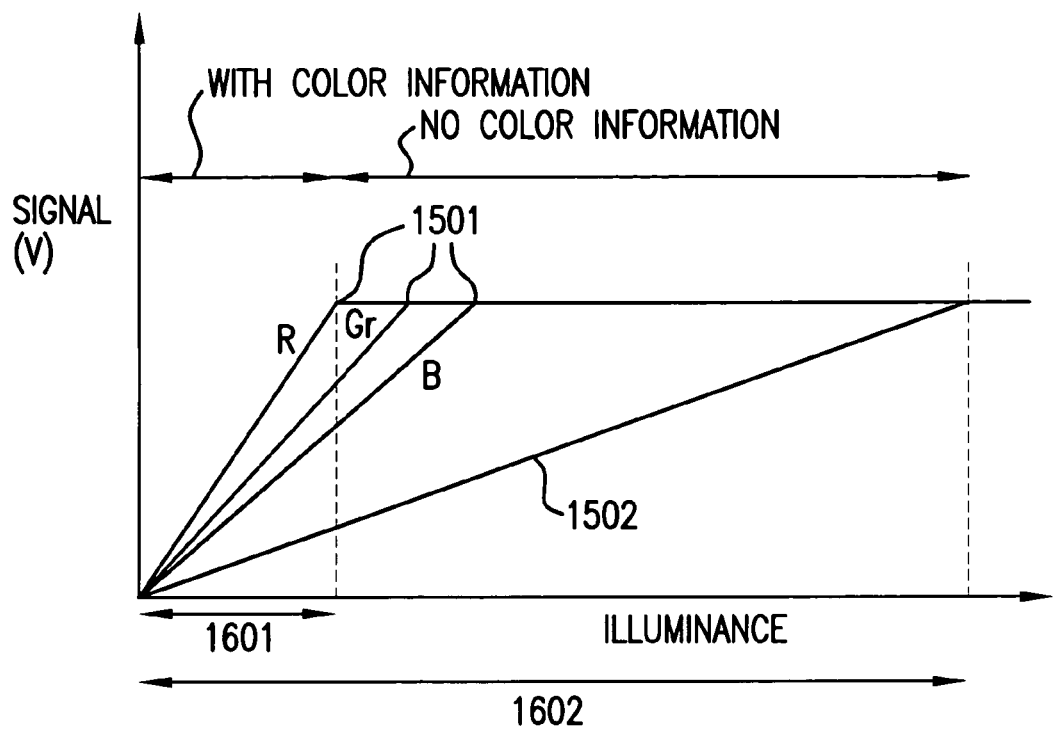
FIG. 16 is a graph illustrating the light transfer characteristics of the image sensor of FIG. 15 under conditions of strong illumination.

The light transfer characteristics under conditions of strong illumination are shown in FIG. 16. Pixel cells of subset 1501, which have an integration period of length N, become saturated and alone yield a narrower dynamic range as depicted by reference numeral 1601. Pixel cells of subset 1502 have an integration period of length S and do not become readily saturated, thereby allowing a wider dynamic range depicted by reference numeral 1602.

Figure 17:
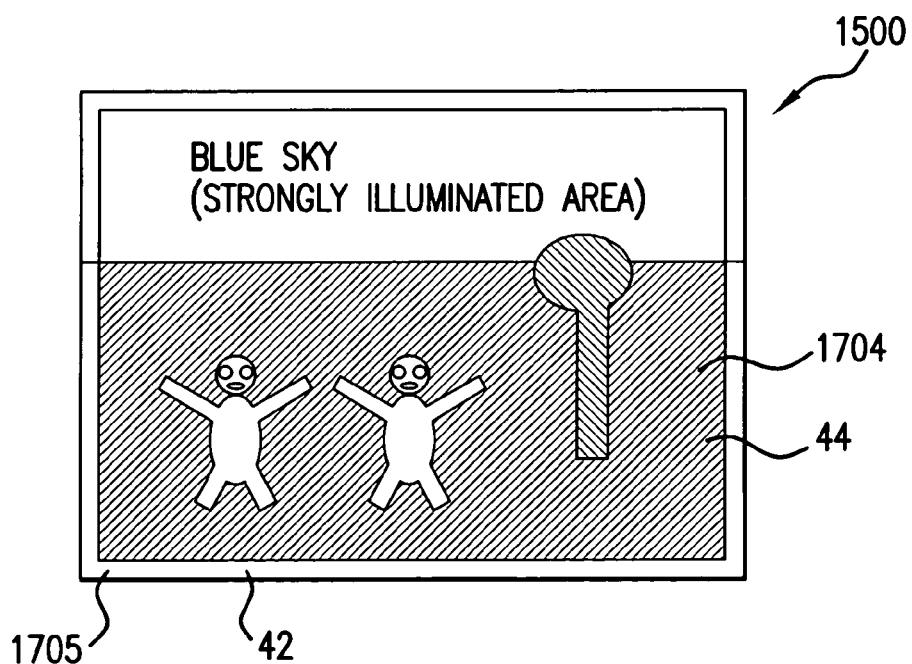
FIG. 17 is a diagram illustrating the array of FIG. 15 according to another exemplary embodiment of the invention.

FIG. 17 depicts an exemplary method for acquiring color information under conditions of strong illumination. Considering a contré-jour scene, where a scene is imaged toward the light source illuminating the scene, some part of an image frame is occupied by a strongly illuminated area. One example of such a scene is an outdoor scene including a bright sky, as shown in FIG. 17. The perimeter 1705 of the imaging array can be used to acquire color information by operating pixel cells in the perimeter with an integration period 42 with a length S. The pixel cells in the perimeter 1705 include those associated with full pattern units of the color filter array pattern, e.g., a Bayer pattern. In the exemplary embodiment of FIG. 15, two rows and two columns of pixel cells in the perimeter 1705 of array 1500 are operated with an integration period 42. In the exemplary embodiment of FIG. 17, the perimeter 1705 includes two uppermost rows, two lowermost rows, two leftmost columns, and two rightmost columns. Different numbers of rows and columns can also constitute perimeter 1705. As would be apparent to those skilled in the art, array 1500 can be easily adapted to achieve this operation based on the teachings of this specification.

Using signal processing, the color information from perimeter 1705 pixel cells can be used to achieve a synthetic signal representing the strongly illuminated area. Color information from the perimeter 1705 pixel cells can be used to "paint" the signals for those pixel cells of the central portion 1704, which correspond to the strongly illuminated area. Otherwise stated, using signal processing, color information obtained from perimeter pixel cells can be used to achieve color information for those pixel cells receiving light from the strongly illuminated area.

Figure 18:
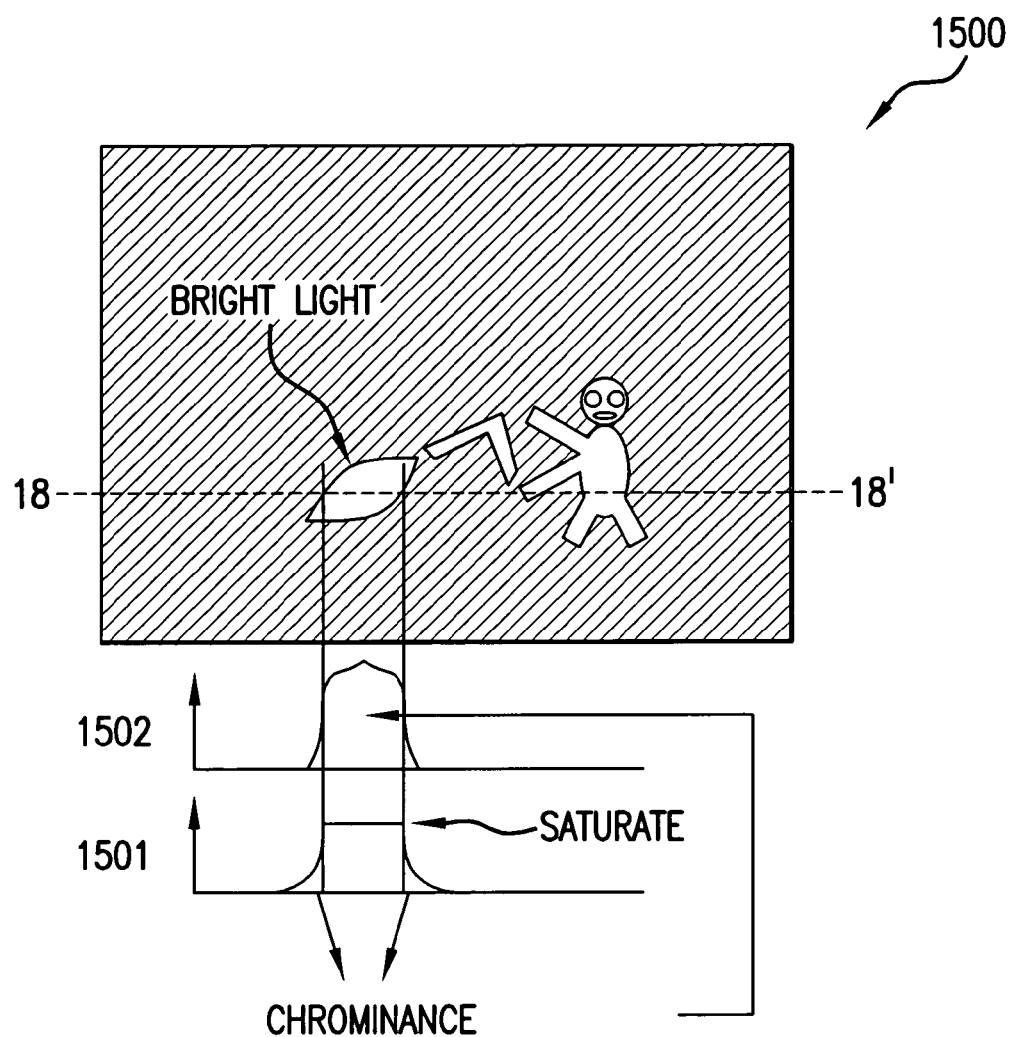
FIG. 18 is a diagram illustrating the operation of the image sensor of FIG. 15 according to another exemplary embodiment of the invention.

The method explained above is useful for a scene having a generalized strongly illuminated area, such as a contre-jour scene. This method, however, cannot be applied for a scene having a localized area of strong illumination, such as a welding light. FIG. 18 shows how to acquire a color signal for such a scene. The graphs of FIG. 18 represent the response of pixel cells of array 1500 along line 18-18', which include pixel cells that receive light from a strongly illuminated area. In the area of strong illumination, signals of pixel cells of subset 1501 are saturated, but pixel cells receiving light from the fringes of the strongly illuminated object are not saturated. A chrominance signal can be obtained from pixel cells of subset 1501 receiving light from the fringe area. This chrominance signal can be used to achieve color information for those pixel cells receiving light from the strongly illuminated area.

The embodiments discussed above in connection with FIGS. 2-18 provide dual integration period operations for image sensors including arrays that have color filters. The invention, however, is not so limited. The techniques discussed above can also be adapted for monochromatic imaging devices.

Figure 19:
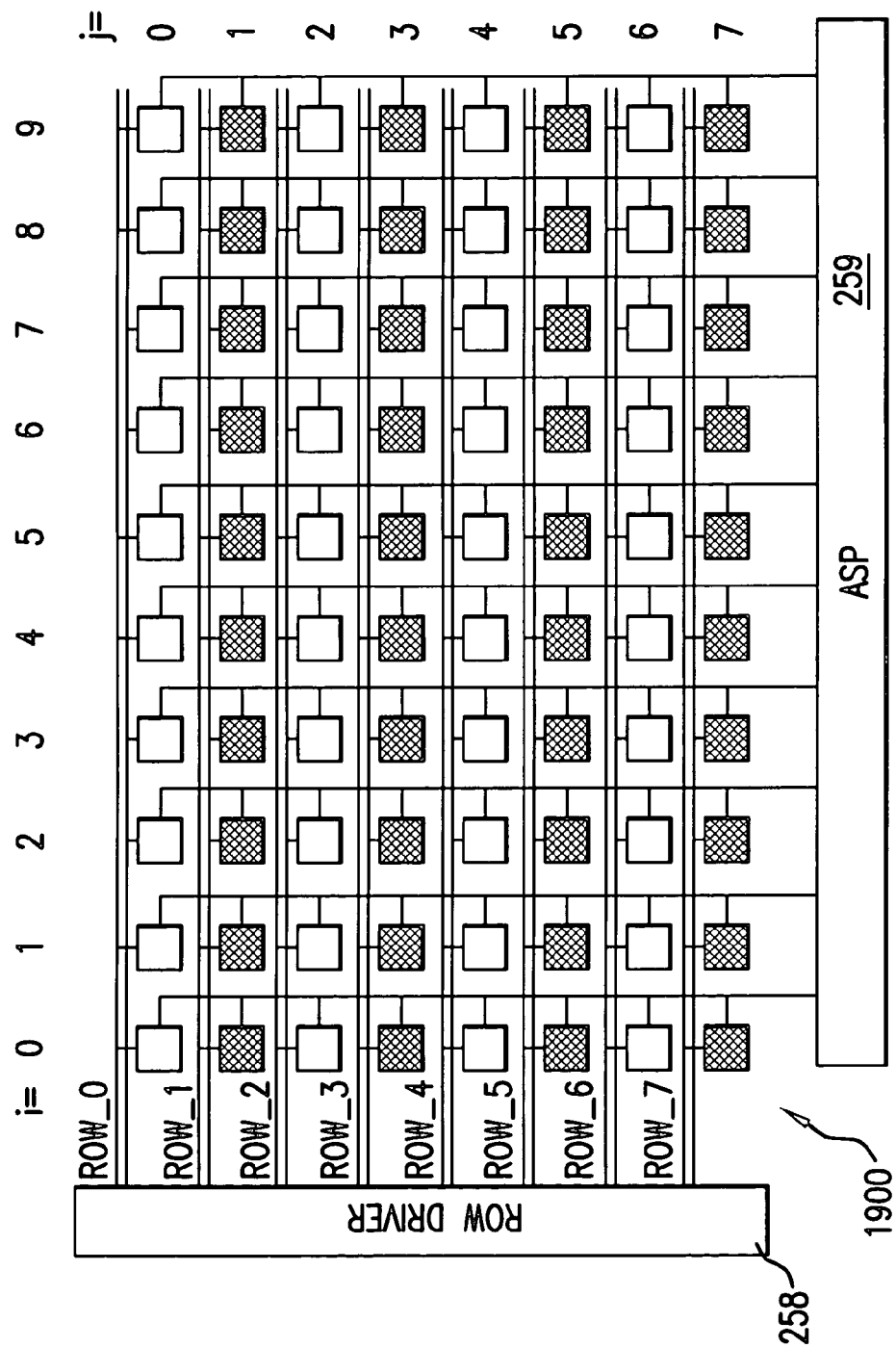
FIG. 19 is a block diagram illustrating a portion of the image sensor of FIG. 2 according to another exemplary embodiment of the invention.

A monochromatic imaging array 1900 to achieve wide dynamic range is shown in FIG. 19. Pixel cells in rows 0, 2, 4 . . . are set to have an integration period with length N (not shown), and pixel cells in rows 1, 3, 5 . . . are set to have an integration period with length S (not shown). An image sensor 201 including array 1900 can be operated according to the timing shown in FIG. 4, except that alternating rows will be configured to have different integration periods. Also, pixel cells of array 2000 can have a configuration as depicted in FIG. 1 or a shared column configuration depicted in FIG. 7.

An original signal output at column i and row j is expressed as S(i,j). The synthesized signal output R(i,j) can be gained as a linear combination of signals, and expressed as follows:

$$R(i,j)=S(i,j)+S(i,j+1) \text{ for } j=0,2,4,6,\ldots n, n+2 \quad \text{(equation 9)}$$

$$R(i,j)=S(i,j)+S(i,j-1) \text{ for } j=1,3,5,7,\ldots n', n'+2 \quad \text{(equation 10)}$$

Where n and n' are row numbers following the respective sequences provided for equations 9 and 10.

To keep original spatial resolutions and adjust output levels between those rows, an interpolation procedure can be considered.

$$R(i,j)=A*S(i,j)+B*(S(i,j-1)+S(i,j+1)) \text{ for } j=0,2,4,6,\ldots n, n+2 \quad \text{(equation 11)}$$

$$R(i,j)=C*S(i,j)+D*(S(i,j-1)+S(i,j+1)) \text{ for } j=1,3,5,7,\ldots n', n'+2 \quad \text{(equation 12)}$$

Where n and n' are row numbers following the respective sequences provided for equations 11 and 12. Where A=C=0.5 and B=D=0.25 for simplicity. Under low light conditions where the signal does not saturate in the longer integration period, A=1, B=0, C=0, D=0.5 are preferable, because there is a high signal to noise ratio. The parameters A through D can be changed continuously depending upon the light intensity. Also, the integration periods 44, 42 can be changed adaptively depending upon the light intensity of the imaged scene. For example, at low light levels, S can be set to equal N and as light levels increase, S can be reduced as compared to N.

Figure 20:
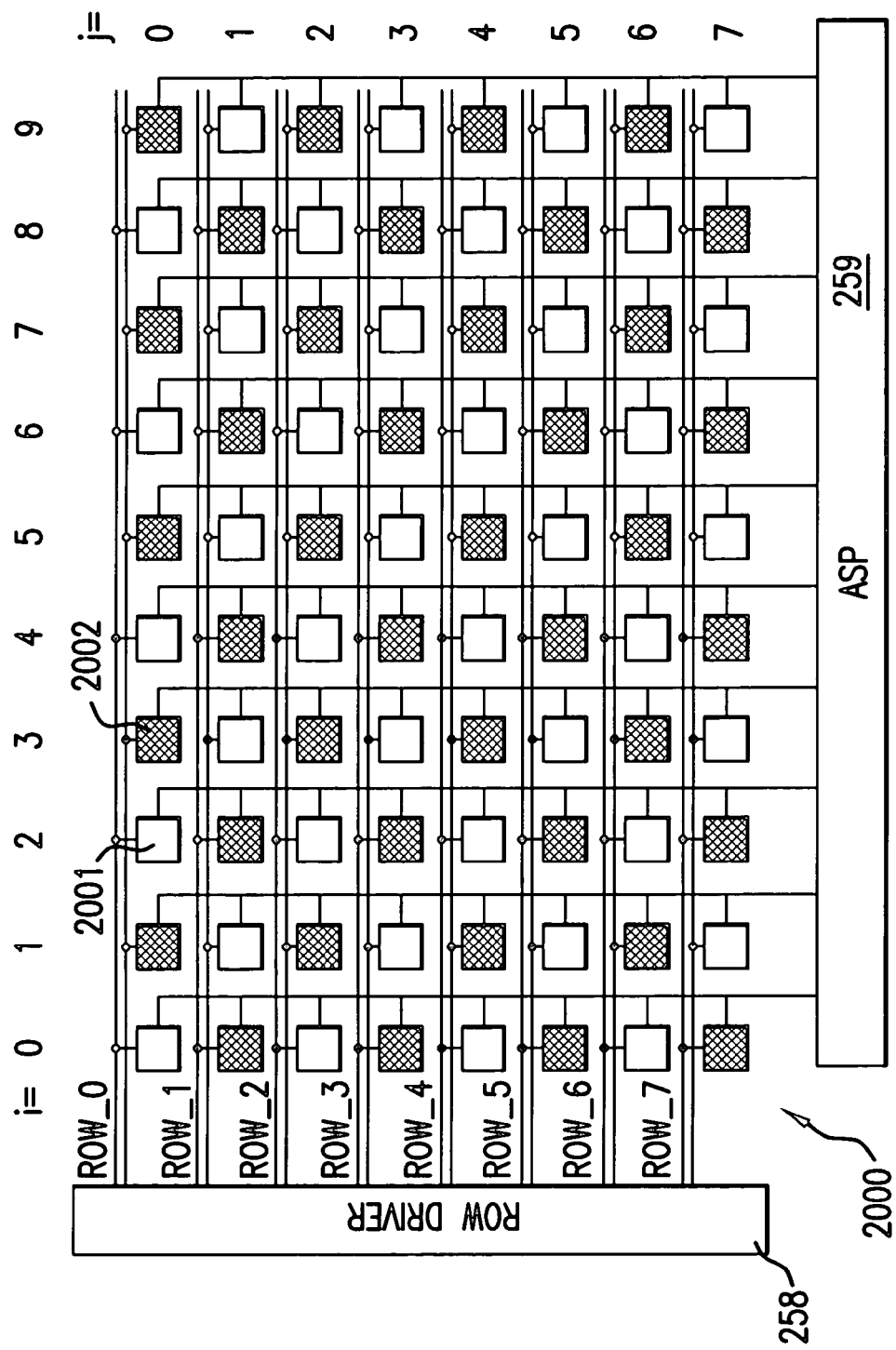
FIG. 20 is a block diagram illustrating a portion of the image sensor of FIG. 2 according to another exemplary embodiment of the invention.

FIG. 20 shows another embodiment for monochromatic array 2000, which is similar to the arrays of FIGS. 11-14. Pixel cells of array 2000 are arranged in subsets 2001, depicted as including pixel cells without cross hatching, and 2002, depicted as including pixel cells with cross hatching. Subset 2001 includes every other pixel cell in a row and every other pixel cell in a column, the subset 2002 includes the pixel cells that are not in the first subset, such that the first and second subsets form a checker board-like (zigzag) pattern, as shown in FIG. 20. Pixel cells of array 2000 can have a configuration as depicted in FIG. 1 or a shared column configuration depicted in FIG. 7.

Pixel cells of subset 2001 are operated to have an integration period with length N, and pixel cells of subset 2002 are operated to have an integration period with length S. As explained above in connection with FIGS. 11-14, the exemplary embodiment of FIG. 20 provides well balanced horizontal and vertical resolutions in wide dynamic range operation. Image sensor 201 including array 2000 can be operated as shown in FIGS. 12 and 14.

A simple procedure to achieve a synthetic output is to add two pixel signals. An original signal output at column i and row j is expressed as S(i,j). The synthesized signal output R(i,j) can be expressed as follows:

$$R(i,j)=S(i,j)+S(i,j+1) \text{ for } j=0, 2, 4, 6, \ldots n, n+1 \quad \text{(equation 13)}$$

$$R(i,j)=S(i,j)+S(i,j-1) \text{ for } j=1, 3, 5, 7, \ldots n', n'+1 \quad \text{(equation 14)}$$

Where n and n' are row numbers following the respective sequences provided for equations 13 and 14. This procedure achieves a wide dynamic range, but it degrades an original spatial resolution.

To keep the original spatial resolutions and adjust output levels between pixels, an interpolation procedure can be considered. The synthesized signal output R(i,j) can be expressed as follows:

$$R(i,j)=A*S(i,j)+B*(S(i-1,j)+S(i+1,j)+S(i,j-1)+S(i,j+1)) \text{ for Pixel}(i,j): \text{Subset } 2001 \quad \text{(equation 15)}$$

$$R(i,j)=C*S(i,j)+D*(S*(i-1,j)+S(i+1,j)+S(i,j-1)+S(i,j+1)) \text{ for Pixel}(i,j): \text{Subset } 2002 \quad \text{(equation 16)}$$

Where A=C=0.5 and B=D=0.125 for simplicity. Under low light condition that the signal does not saturate in the longer integration period, A=1, B=0, C=0, D=0.25 are preferable, because there is a high signal to noise ratio. The parameters A through D can be changed continuously depending upon the light intensity. Also, the integration periods 44, 42 can be changed adaptively depending upon the light intensity of the imaged scene. For example, at low light levels, S can be set to equal N and as light levels increase, S can be reduced as compared to N.

Although embodiments of the invention have been described as particular interpolation processes which use particular equations 1-16, the invention is not so limited. Any other appropriate interpolation algorithms can be applied.

While embodiments of the invention are described in connection with CMOS pixel cells having particular configurations, the invention can be implemented using CMOS pixel cells having alternative configurations. For example, pixel cells having additional circuitry, e.g., anti-blooming circuitry or electronic shutter circuitry, can also be used. Further, although embodiments of the invention are described in connection with particular timing operations, the invention is not so limited. Additional timing operations can be used and modifications to the timing shown can be made, which are within the scope of the invention. For example, where pixel cells include an electronic shutter, operation of the image sensor can be accordingly adapted.

Figure 21:
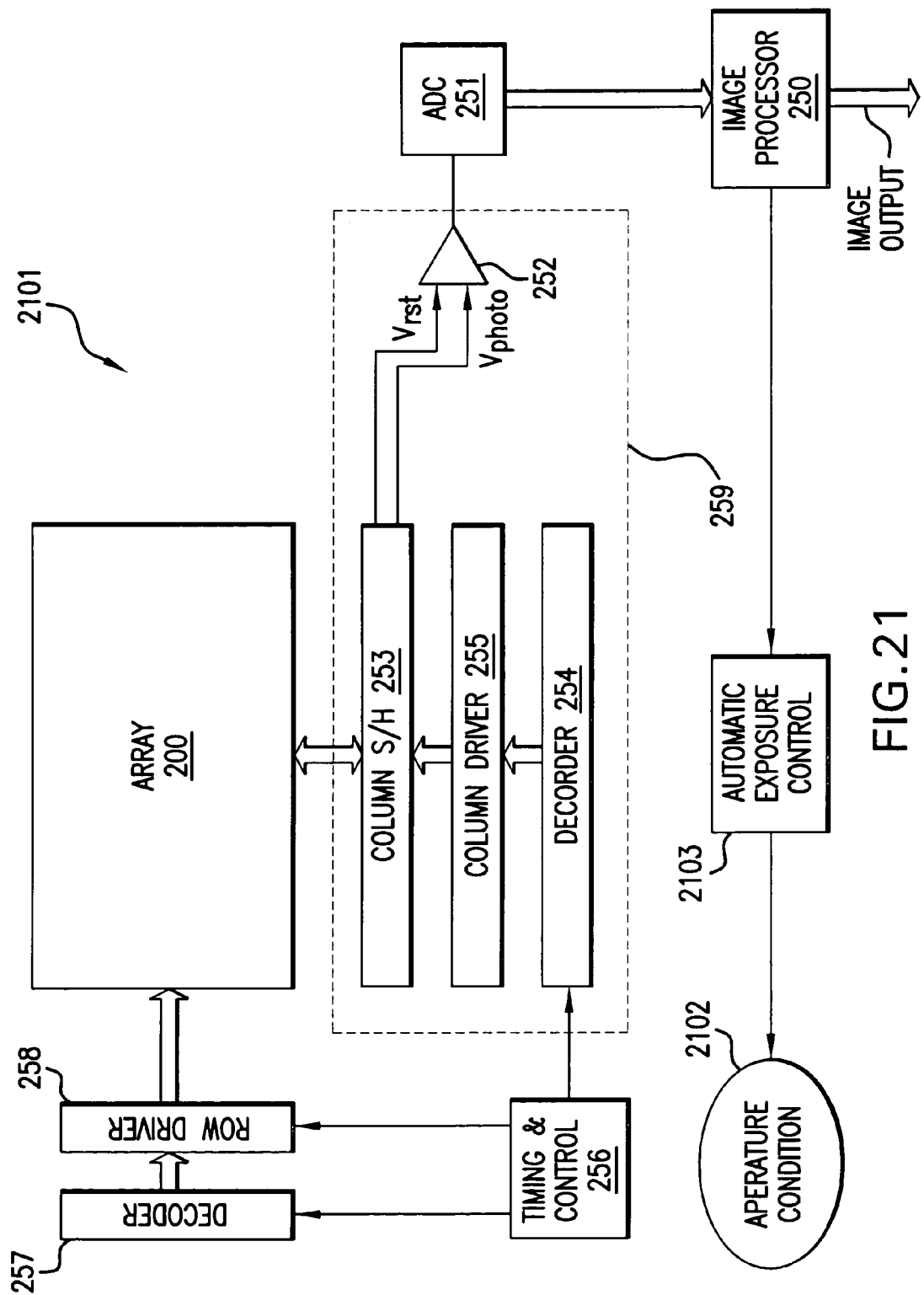
FIG. 21 is a block diagram illustrating of an image sensor according to another exemplary embodiment of the invention.

The dual integration period approaches of embodiments of the invention are not only useful to achieve a wide dynamic range, but also to achieve improved automatic exposure control. FIG. 21 is a block diagram of an image sensor 2101, which includes automatic exposure control circuitry 2103. Conventionally, automatic exposure control is performed by varying an aperture condition 2102, e.g., an integration period and an iris of lens, by checking the signal output at every frame. An exemplary method for conventional automatic exposure control is discussed in U.S. Pat. No. 6,486,915, which is incorporated herein by reference.

For each frame, embodiments of the invention provide two sets of signals each having a different integration period 44, 42. The automatic control circuitry 2103 can use the two sets of signals to determine a proper aperture condition 2102, thereby reducing the time for automatic exposure control and providing more efficient operation as compared to the case where only a single integration period is used. As one of ordinary skill in the art will appreciate, conventional automatic exposure control techniques and circuitry can be readily adapted to accommodate the two sets of signals provided by embodiments of the present invention.

Figure 22:
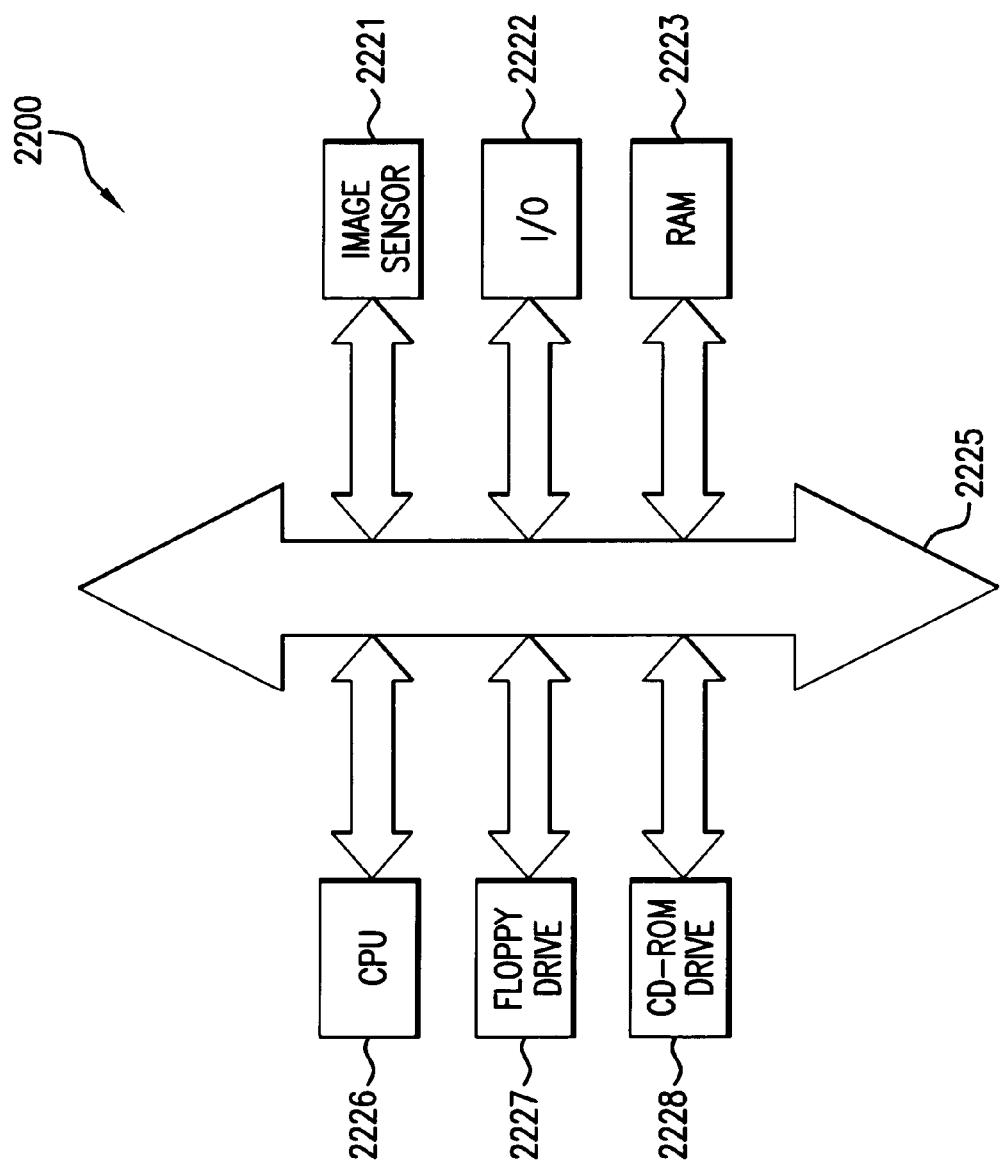
FIG. 22 is a block diagram illustrating a processor system according to an exemplary embodiment of the invention.

A processor based system 2200, which includes a CMOS image sensor according to the invention is illustrated generally at 2221 in FIG. 22. Processor based system 2200 is exemplary of a system having digital circuits, which could include an image sensor. Without being limiting, such a system could include a computer system, camera system, scanner, machine vision, vehicle navigation, video phone, surveillance system, auto focus system, star tracker system, motion detection system, image stabilization system and data compression system for high-definition television, all of which can utilize the present invention.

Processor based system 2200, such as a computer system, for example generally comprises a central processing unit (CPU) 2226, for example, a microprocessor, which communicates with an input/output (I/O) device 2222 over a bus 2225. The CMOS image sensor 2221 also communicates with the system over bus 2225. The computer system 2200 also includes random access memory (RAM) 2223, and, in the case of a computer system may include peripheral devices such as a floppy drive 2227, or a compact disk (CD) ROM drive 2228 which also communicate with CPU 2226 over the bus 2225. It may also be desirable to integrate the processor 654, CMOS image sensor 2221 and memory 2223 on a single IC chip.

While the invention has been described in detail in connection with preferred embodiments known at the time, it should be readily understood that the invention is not limited to the disclosed embodiments. Rather, the invention can be modified to incorporate any number of variations, alterations, substitutions or equivalent arrangements not heretofore described, but which are commensurate with the spirit and scope of the invention.

The invention claimed is:

1. A method of operating an image sensor comprising an array of pixel cells, the method comprising:
    arranging the pixel cells in rows and subgroups, each subgroup including two adjacent rows of pixel cells,
    arranging the pixel cells into first and second subsets such that the first subset includes every other subgroup beginning with an uppermost row, the second subset includes every other subgroup beginning with a third row, such that the first and second subsets do not include same subgroups;
    accumulating first charge in a first subset of pixel cells during a first integration period;
    accumulating second charge in a second subset of pixel cells during a second integration period, a length of the first integration period being different than a length of the second integration period, the pixel cells accumulating only first or second charge per frame;
    reading out the accumulated first and second charge; and
    further comprising the act of producing respective synthetic signals corresponding to each pixel cell of the array using results of the readout accumulated first and second charge, wherein producing respective synthetic signals comprises applying the equation $R(i,j)=S(i,j)+S(i,j+2)$ to produce synthetic signals corresponding to respective pixel cells of the first subset and applying the equation $R(i,j)=S(i,j)+S(i,j-2)$ to produce synthetic signals corresponding to respective pixel cells of the second subset, where i is a column number of a pixel cell, j is a row number of the pixel cell, S is an original signal for a pixel cell, and R is the synthesized signal corresponding to a pixel cell.

2. The method of claim 1, further comprising the act of varying the lengths of the first and second integration periods depending upon an intensity of light incident on the array.

3. The method of claim 1, further comprising the act of using results of the readout accumulated first and second charge to determine an aperture condition.

4. The method of claim 1, wherein color filters arranged in a Bayer pattern are provided, wherein each pixel cell is associated with a respective color filter, and wherein $R(i,j)$ is the sum of original signals for pixel cells associated with color filters corresponding to a same color.

5. The method of claim 1, further comprising simultaneously resetting respective photo-conversion devices of each pixel cell to a predetermined voltage prior to the acts of accumulating first charge and accumulating second charge.

6. A method of operating an image sensor comprising an array of pixel cells, the method comprising:
    providing color filters corresponding to a plurality of colors, there being at least twice the number of color filters corresponding to a first color than to a second color, each color filter being associated with a respective pixel cell;
    arranging the pixel cells into first and second subsets, wherein the act of arranging the pixel cells into first and second subsets comprises arranging the pixel cells such that the first subset includes pixel cells associated with color filters corresponding to the second color and a first half of the pixel cells associated with color filters corresponding to the first color and the second subset includes a second half of the pixel cells associated with color filters corresponding to the first color;
    accumulating first charge in a first subset of pixel cells during a first integration period;
    accumulating second charge in a second subset of pixel cells during a second integration period, a length of the first integration period being different than a length of the second integration period, the pixel cells accumulating only first or second charge per frame;
    reading out the accumulated first and second charge; and
    further comprising the act of producing respective synthetic signals corresponding to each pixel cell of the array using results of the readout accumulated first and second charge, wherein producing respective synthetic signals comprises using chrominance information from at least a portion of pixel cells of the first subset to obtain chrominance information for at least a portion of pixel cells of the second subset and using luminance information from at least a portion of pixel cells of the second subset to obtain luminance information for at least a portion of pixel cells of the first subset.

7. The method of claim 6, further comprising the act of arranging the color filters in a Bayer pattern.

8. A method of operating an image sensor comprising an array of pixel cells, the method comprising:
    arranging the pixel cells in columns, rows, and first and second subsets, the first and second subsets including subgroups of pixel cells, the subgroups each including two adjacent rows of pixel cells, the first subset including every other subgroup and the second subset including subgroups not in the first subset;
    accumulating first charge in a first subset of pixel cells during a first integration period;
    accumulating second charge in a second subset of pixel cells during a second integration period, a length of the first integration period being longer than a length of the second integration period, the pixel cells accumulating only first or second charge per frame;

reading out the accumulated first and second charge; and producing respective synthetic signals corresponding to each pixel cell of the array using results of the read out accumulated first and second charge, wherein producing respective synthetic signals comprises applying the equation $R(i,j)=A*S(i,j)+B*(S(i,j-2)+S(i,j+2))$ to produce respective synthetic signals corresponding to pixel cells of the first subset and applying the equation $R(i,j)=C*S(i,j)+D*(S(i,j-2)+S(i,j+2))$ to produce synthetic signals corresponding to respective pixel cells of the second subset, where A, B, C and D are numerical parameters between 1 and 0, i is a column number of a pixel cell, j is a row number of a pixel cell, S is an original signal for a pixel cell, and R is the synthesized signal corresponding to a pixel cell.

9. A method of operating an image sensor comprising an array of pixel cells, the method comprising:

arranging the pixel cells in columns, rows, and first and second subsets, the subsets including subgroups;

providing color filters arranged in a Bayer pattern, each pixel cell being associated with a respective color filter, a subgroup including pixel cells of a Bayer pattern unit, the first subset including every other subgroup, the second subset including subgroups not in the first subset, such that the subsets form a checker board-like pattern;

accumulating first charge in a first subset of pixel cells during a first integration period;

accumulating second charge in a second subset of pixel cells during a second integration period, a length of the first integration period being longer than a length of the second integration period, the pixel cells accumulating only first or second charge per frame;

reading out the accumulated first and second charge; and producing respective synthetic signals corresponding to each pixel cell of the array using results of the read out accumulated first and second charge, wherein producing respective synthetic signals comprises applying the equation $R(i,j)=S(i,j)+S(i,j+2)$ for a sequence $j=0, 1, 4, 5, 8, 9 \ldots n, n+1$, and the equation $R(i,j)=S(i,j)+S(i,j-2)$ for a sequence $j=2, 3, 6, 7, 10, 11 \ldots n', n'+1$ to produce synthetic signals corresponding respective pixel cells, where i is a column number of a pixel cell, j is a row number of a pixel cell, n and n' are row numbers consistent with the respective sequences, S is an original signal for a pixel cell, and R is the synthesized signal corresponding to a pixel cell.

10. A method of operating an image sensor comprising an array of pixel cells, the method comprising:

accumulating first charge in a first subset of pixel cells during a first integration period;

accumulating second charge in a second subset of pixel cells during a second integration period, a length of the first integration period being different than a length of the second integration period, the pixel cells accumulating only first or second charge per frame;

reading out the accumulated first and second charge;

applying a first equation $R(i,j)=S(i,j)+S(i,j+1)$ for a sequence $j=0, 2, 4, 6, \ldots n, n+2$ to produce synthetic signals corresponding to respective pixel cells;

and applying a second equation $R(i,j)=S(i,j)+S(i,j-1)$ for a sequence $j=1, 3, 5, 7, \ldots n', n'+2$ to produce synthetic signals corresponding to respective pixel cells, where i is a column number of a pixel cell, j is a row number of a pixel cell, n and n' are row numbers consistent with the respective sequences, S is an original signal for a pixel cell, and R is the synthesized signal corresponding to a pixel cell.

11. A method of operating an image sensor comprising an array of pixel cells, the method comprising:

accumulating first charge in a first subset of pixel cells during a first integration period;

accumulating second charge in a second subset of pixel cells during a second integration period, a length of the first integration period being longer than a length of the second integration period, the pixel cells accumulating only first or second charge per frame;

reading out the accumulated first and second charge;

applying a first equation $R(i,j)=A*S(i,j)+B*(S(i,j-1)+S(i,j+1))$ for a sequence $j=0,2,4,6, \ldots n, n+2$ to produce synthetic signals corresponding respective pixel cells; and applying a second equation $R(i,j)=C*S(i,j)+D*(S(i,j-1)+S(i,j+1))$ for a sequence $j=1,3,5,7, \ldots n', n'+2$ to produce synthetic signals corresponding respective pixel cells, where A, B, C and D are numerical parameters between 1 and 0, i is a column number of a pixel cell, j is a row number of a pixel cell, n and n' are row numbers consistent with the respective sequences, S is an original signal for a pixel cell, and R is the synthesized signal corresponding to a pixel cell.

12. A method of operating an image sensor comprising an array of pixel cells, the method comprising:

arranging the pixel cells in columns, rows, and first and second subsets, the first subgroup including every other pixel cell in a row and every other pixel cell in a column, the second subset including the pixel cells not in the first subset, the first and second subsets forming a checker board-like pattern;

accumulating first charge in the first subset of pixel cells during a first integration period;

accumulating second charge in the second subset of pixel cells during a second integration period, a length of the first integration period being longer than a length of the second integration period, the pixel cells accumulating only first or second charge per frame;

reading out the accumulated first and second charge; and producing respective synthetic signals corresponding to each pixel cell of the array using results of the read out accumulated first and second charge, wherein producing respective synthetic signals comprises either:

applying the equation $R(ij)=S(i,j)+S(i,j+1)$ for a sequence $j=0, 2, 4, 6, \ldots n, n+2$ and the equation $R(i,j)=S(i,j)+S(i,j-1)$ for a sequence $j=1,3,5,7, \ldots n', n'+2$ to produce synthetic signals corresponding respective pixel cells, where i is a colunm number of a pixel cell, j is a row number of a pixel cell, n and n' are row numbers consistent with the respective sequences, S is an original signal for a pixel cell, and R is the synthesized signal corresponding to a pixel cell; or applying the equations $R(i,j)=A*S(i,j)+B*(S(i,j-1)+S(i,j+1))$ to produce synthetic signals corresponding respective pixel cells of the first subset and $R(i,j)=C*S(i,j)+D*(S(i,j-1)+S(i,j+1))$ to produce synthetic signals corresponding respective pixel cells of the second subset, where A, B, C and D are numerical parameters between 1 and 0, i is a column number of a pixel cell, j is a row number of a pixel cell, S is an original signal for a pixel cell, and R is the synthesized signal corresponding to a pixel cell.

13. A method of operating an image sensor comprising an array of pixel cells, the method comprising:

providing color filters arranged in a Bayer pattern, each pixel cell being associated with a respective color filter;

accumulating first charge in a first subset of pixel cells during a first integration period;

accumulating second charge in a second subset of pixel cells during a second integration period, a length of the first integration period being longer than a length of the second integration period, the pixel cells accumulating only first or second charge per frame, wherein the first subset includes the pixel cells associated with the non-redundant color filters of each Bayer pattern unit, and wherein the second subset includes the pixel cells associated with the redundant color filters of each Bayer pattern unit;

reading out the accumulated first and second charge; and producing respective synthetic signals corresponding to at least a portion of the pixel cells using results of the read out accumulated first and second charge, wherein the synthetic signals are calculated using chrominance information from pixel cells of the first subset to obtain chrominance information for pixel cells of the second subset and using luminance information from pixel cells of the second subset to obtain luminance information for pixel cells of the first subset.

14. An image sensor comprising:

an array of pixel cells;

a color filter array comprising color filters corresponding to a plurality of colors, the color filter array having at least twice the number of color filters corresponding to a first color than to a second color, wherein each pixel cell is associated with a respective color filter;

timing and control circuitry in communication with the array, the timing and control circuitry configured to cause first charge to be accumulated in a first subset of pixel cells during a first integration period and second charge to be accumulated in a second subset of pixel cells during a second integration period, a length of the first integration period being different than a length of the second integration period, the pixel cells accumulating only first or second charge per frame, wherein the first subset includes pixel cells associated with color filters corresponding to the second color and a first half of the pixel cells associated with color filters corresponding to the first color, and wherein the second subset includes a second half of the pixel cells associated with color filters corresponding to the first color;

readout circuitry for reading out the accumulated first and second charge; and processing circuitry for producing respective synthetic signals corresponding to each pixel cell of the array using results of the read out accumulated first and second charge, wherein the processing circuitry is configured to produce respective synthetic signals corresponding to at least a portion of the pixel cells using chrominance information from pixel cells of the first subset to obtain chrominance information for pixel cells of the second subset and using luminance information from pixel cells of the second subset to obtain luminance information for pixel cells of the first subset.

15. The image sensor of claim 14, wherein pixel cells of the array are arranged in rows, wherein the first and second subsets include subgroups of pixel cells, the subgroups each including two adjacent rows of pixel cells, the first subset including every other subgroup and the second subset including every other subgroup, such that the first and second subsets do not include same subgroups.

16. The image sensor of claim 15, wherein the processing circuitry is configured to apply the equation $R(i,j)=S(i,j)+S(i,j+2)$ to produce synthetic signals corresponding to respective pixel cells of the first subset and applying the equation $R(i,j)=S(i,j)+S(i,j-2)$ to produce synthetic signals corresponding to respective pixel cells of the second subset, where i is a column number of a pixel cell, j is a row number of a pixel cell, S is an original signal for a pixel cell, and R is the synthesized signal corresponding to a pixel cell.

17. The image sensor of claim 15, wherein the processing circuitry is configured to apply the equation $R(i,j)=A*S(i,j)+B*(S(i,j-2)+S(i,j+2))$ to produce respective synthetic signals corresponding to pixel cells of the first subset and applying the equation $R(i,j)=C*S(i,j)+D*(S(i,j-2)+S(i,j+2))$ to produce synthetic signals corresponding to respective pixel cells of the second subset, where A, B, C and D are numerical parameters between 1 and 0, i is a column number of a pixel cell, j is a row number of a pixel cell, S is an original signal for a pixel cell, and R is the synthesized signal corresponding to a pixel cell.

18. The image sensor of claim 14, further comprising:

a first row select line for each row for selecting pixel cells of the first subset; and a second row select line for each row for selecting pixel cells of the second subset, wherein the pixel cells are arranged in columns and rows, wherein the first and second subsets include subgroups of pixel cells, each subgroup including adjacent pixel cells associated with a color filter of at least one of each color, wherein the first subset includes every other subgroup, and wherein the second subset includes pixel cells not in the first subset.

19. The image sensor of claim 18, wherein each subgroup includes a first pixel cell associated with a color filter corresponding to a first color, a second pixel cell associated with a color filter corresponding to a second color, a third pixel cell associated with a color filter corresponding to a third color, and a fourth pixel cell associated with a color filter corresponding to the first color, the first and second pixel cells being located adjacent to one another and in a same row, the third and fourth pixel cells being adjacent to one another and in a same row, the third and first pixel cells being adjacent to one another in a same column, and the second and fourth pixel cells being adjacent to one another in a same column.

20. The image sensor of claim 19, wherein the processing circuitry is configured to apply the equation $R(i,j)=S(i,j)+S(i,j+2)$ for a sequence $j=0, 1, 4, 5, 8, 9 \ldots n, n+1$, and the equation $R(i,j)=S(i,j)+S(i,j-2)$ for a sequence $j=2, 3, 6, 7, 10, 11 \ldots n', n'+1$ to produce synthetic signals corresponding respective pixel cells of the array, where i is a column number of a pixel cell, j is a row number of a pixel cell, n and n' are row numbers consistent with the respective sequences, S is an original signal for a pixel cell, and R is the synthesized signal corresponding to a pixel cell.

21. The image sensor of claim 19, wherein the processing circuitry is configured to apply the equation $R(i,j)=A*S(i,j)+B*(S(i-2,j)+S(i+2,j)+S(i,j-2)+S(i,j+2))$ to produce synthetic signals corresponding to respective pixel cells of the first subset and $R(i,j)=C*S(i,j)+D*(S(i-2,j)+S(i+2,j)+S(i,j-2)+S(i,j+2))$ to produce synthetic signals corresponding respective pixel cells of the second subset, where A, B, C and D are numerical parameters between 1 and 0, i is a column number of a pixel cell, j is a row number of a pixel cell, S is an original signal for a pixel cell, and R is the synthesized signal corresponding to a pixel cell.

22. The image sensor of claim 14, wherein the processing circuitry is configured to apply the equation $R(i,j)=S(i,j)+S(i,j+1)$ for a sequence $j=0, 2, 4, 6, \ldots n, n+2$ and the equation $R(i,j)=S(i,j)+S(i,j-1)$ for a sequence $j=1, 3, 5, 7, \ldots n', n'+2$ to produce synthetic signals corresponding respective pixel cells of the array, where i is a column number of a pixel cell, j is a row number of a pixel cell, n and n' are row numbers consistent with the respective sequences, S is an original signal for a pixel cell, and R is the synthesized signal corresponding to a pixel cell.

23. The image sensor of claim 14, wherein the processing circuitry is configured to apply the equations $R(i,j)=A*S(i,j)+B*(S(i,j-1)+S(i,j+1))$ for a sequence $j=0,2,4,6,\ldots n, n+2$ and $R(i,j)=C*S(i,j)+D*(S(i,j-1)+S(i,j+1))$ for a sequence $j=1,3,5,7,\ldots n', n'+2$ to produce synthetic signals corresponding respective pixel cells of the array, where A, B, C and D are numerical parameters between 1 and 0, i is a column number of a pixel cell, j is a row number of a pixel cell, n and n' are row numbers consistent with the respective sequences, S is an original signal for a pixel cell, and R is the synthesized signal corresponding to a pixel cell.

24. The image sensor of claim 14, wherein the pixel cells are arranged in columns and rows, wherein the first subset includes every other pixel cell in a row and every other pixel cell in a column, and wherein the second subset includes the pixel cells not in the first subset, such that the first and second subsets form a checker board-like pattern.

25. The image sensor of claim 24, wherein the processing circuitry is configured to apply the equation $R(i,j)=S(i,j)+S(i,j+1)$ for a sequence $j=0, 2, 4, 6, \ldots n, n+2$ and the equation $R(i,j)=S(i,j)+S(i,j-1)$ for a sequence $j=1, 3, 5, 7, \ldots n', n'+2$ to produce synthetic signals corresponding respective pixel cells, where i is a column number of a pixel cell, j is a row number of a pixel cell, n and n' are row numbers consistent with the respective sequences, S is an original signal for a pixel cell, and R is the synthesized signal corresponding to a pixel cell.

26. The image sensor of claim 24, wherein the processing circuitry is configured to apply the equations $R(i,j)=A*S(i,j)+B*(S(i,j-1)+S(i,j+1))$ to produce synthetic signals corresponding respective pixel cells of the first subset and $R(i,j)=C*S(i,j)+D*(S(i,j-1)+S(i,j+1))$ to produce synthetic signals corresponding respective pixel cells of the second subset, where A, B, C and D are numerical parameters between 1 and 0, i is a column number of a pixel cell, j is a row number of a pixel cell, S is an original signal for a pixel cell, and R is the synthesized signal corresponding to a pixel cell.

27. The image sensor of claim 14, wherein the first subset includes pixel cells within a central portion of the array and the second subset includes pixel cells in a perimeter portion of the array, and wherein the processing circuitry is configured to produce respective synthetic signals corresponding to at least a portion of the pixel cells using chrominance information from pixel cells of the second subset to obtain chrominance information for pixel cells of the first subset.

28. The image sensor of claim 14, wherein at least two pixel cells share common readout circuitry.

29. A processor system comprising:
a processor; and
an image sensor coupled to the processor, the image sensor comprising:
a color filter array comprising color filters of a plurality of colors;
an array of pixel cells, the pixel cells arranged in rows and subgroups, the subgroups each comprising a first pixel cell associated with a color filter corresponding to a first color, a second pixel cell associated with a color filter corresponding to a second color, a third pixel cell associated with a color filter corresponding to a third color, and a fourth pixel cell associated with a color filter corresponding to the first color, the first, second, third and fourth pixel cells being adjacent to one another;
the pixel cells further arranged into first and second subsets, the first subset comprising every other subgroup and the second subset comprising subgroups not in the first subset, the first and second subsets arranged in a checker board-like pattern;
timing and control circuitry in communication with the array, the timing and control circuitry configured to cause first charge to be accumulated in a first subset of pixel cells during a first integration period and second charge to be accumulated in a second subset of pixel cells during a second integration period, a length of the first integration period being longer than a length of the second integration period, the pixel cells accumulating only first or second charge per frame;
readout circuitry for reading out the accumulated first and second charge; and
processing circuitry for producing respective synthetic signals corresponding to each pixel cell of the array using results of the read out accumulated first and second charge, the processing circuitry configured to apply the equation $R(i,j)=A*S(i,j)+B*(S(i-2,j)+S(i+2,j)+S(i,j-2)+S(i,j+2))$ to produce synthetic signals corresponding to respective pixel cells of the first subset and $R(i,j)=C*S(i,j)+D*(S(i-2,j)+S(i+2,j)+S(i,j-2)+S(i,j+2))$ to produce synthetic signals corresponding respective pixel cells of the second subset, where A, B, C and D are numerical parameters between 1 and 0, i is a column number of a pixel cell, j is a row number of a pixel cell, S is an original signal for a pixel cell, and R is the synthesized signal corresponding to a pixel cell.

30. The system of claim 29, wherein $R(i,j)$ is the sum of original signals for pixel cells associated with color filters corresponding to a same color.

31. The system of claim 29, wherein A and C equal 0.5, and B and D equal 0.25.

32. The system of claim 29, wherein A equals 1, B and C equal 0, and D equals 0.5.

33. The method of claim 29, wherein producing respective synthetic signals comprises varying A, B, C, and D depending upon an intensity of light incident on the array.

* * * * *

UNITED STATES PATENT AND TRADEMARK OFFICE
CERTIFICATE OF CORRECTION

PATENT NO. : 7,446,812 B2 Page 1 of 1
APPLICATION NO. : 10/755411
DATED : November 4, 2008
INVENTOR(S) : Ando et al.

It is certified that error appears in the above-identified patent and that said Letters Patent is hereby corrected as shown below:

In column 20, line 47, in Claim 12, delete "(ij)" and insert -- (i,j) --, therefor.

In column 20, line 51, in Claim 12, delete "colunm" and insert -- column --, therefor.

In column 22, line 7, in Claim 16, delete "colunm" and insert -- column --, therefor.

In column 22, line 14, in Claim 17, delete "C *S" and insert -- C*S --, therefor.

Signed and Sealed this

Tenth Day of March, 2009

JOHN DOLL
*Acting Director of the United States Patent and Trademark Office*